Nov. 22, 1960     A. G. VAN ALSTYNE     2,961,650
RANGE AND ANGLE TRACKING OF AIRCRAFT USING ANGLE GATED VIDEO
Filed Jan. 11, 1952     11 Sheets-Sheet 1
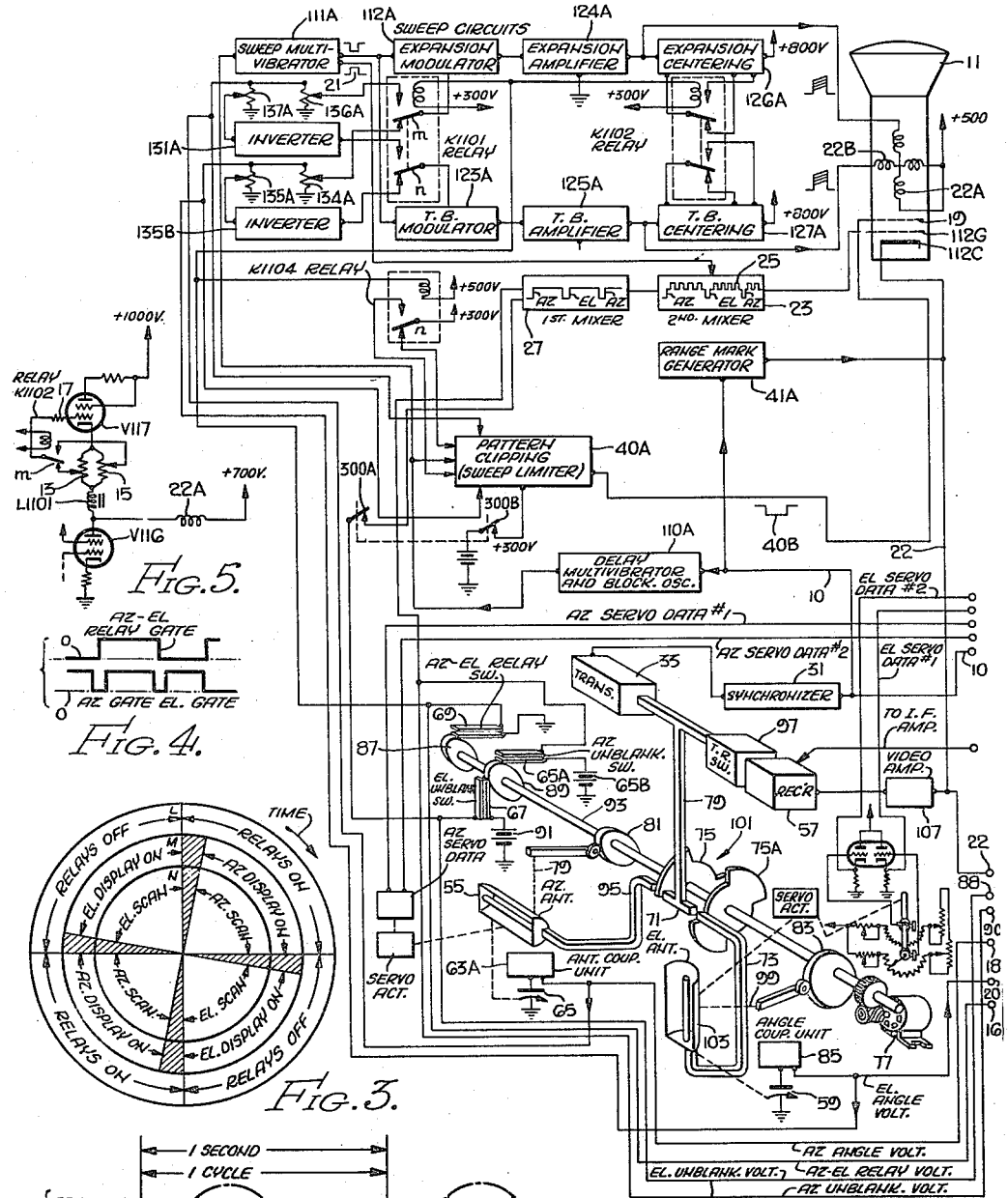
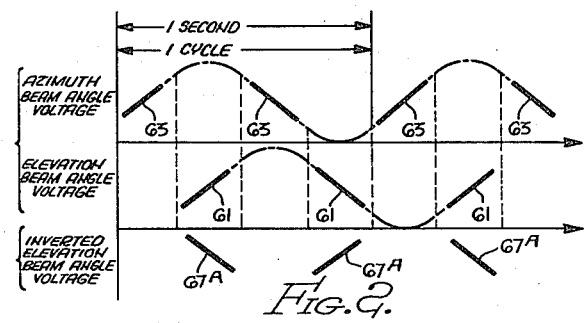
INVENTOR.
ALVIN GUY VAN ALSTYNE
BY
*Lyon & Lyon*
ATTORNEYS Nov. 22, 1960
A. G. VAN ALSTYNE
2,961,650
RANGE AND ANGLE TRACKING OF AIRCRAFT USING ANGLE GATED VIDEO
Filed Jan. 11, 1952
11 Sheets-Sheet 2
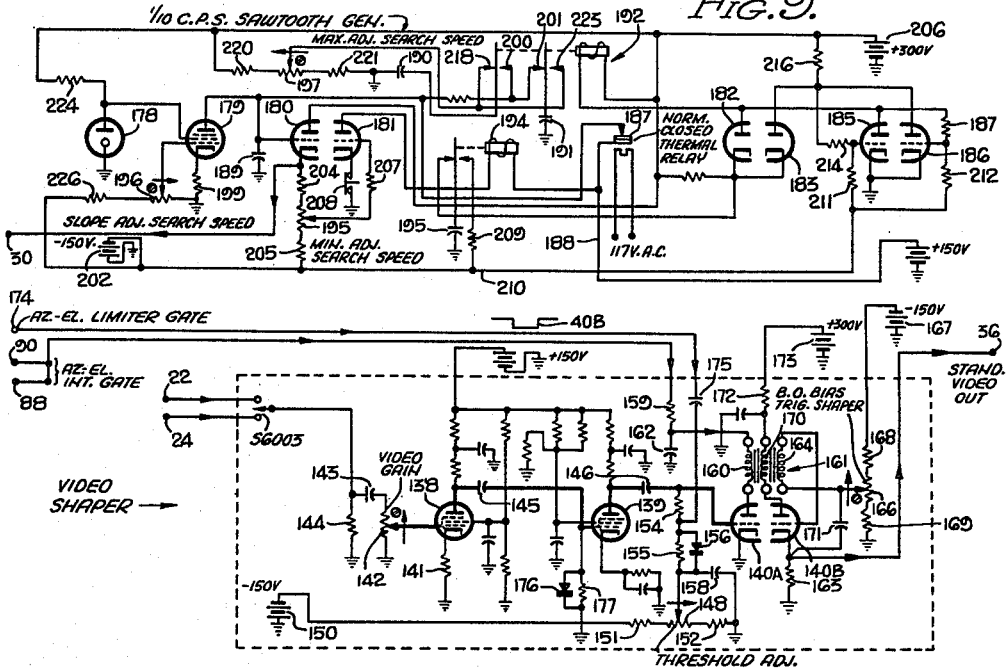
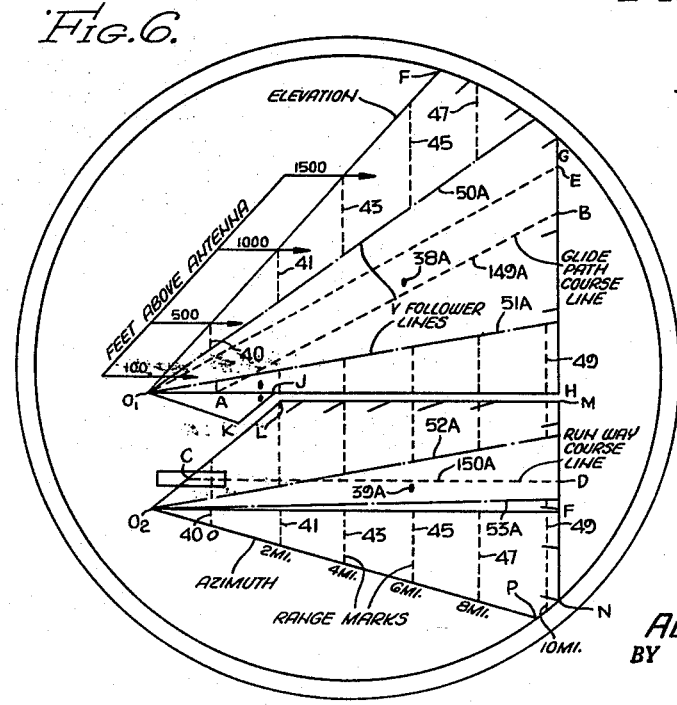
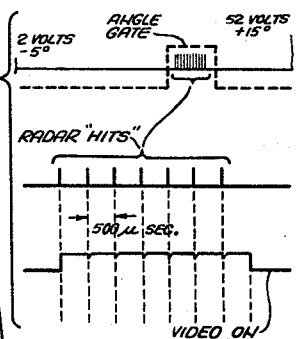
INVENTOR.
ALVIN GUY VAN ALSTYNE
BY
*Lyon & Lyon*
ATTORNEYS

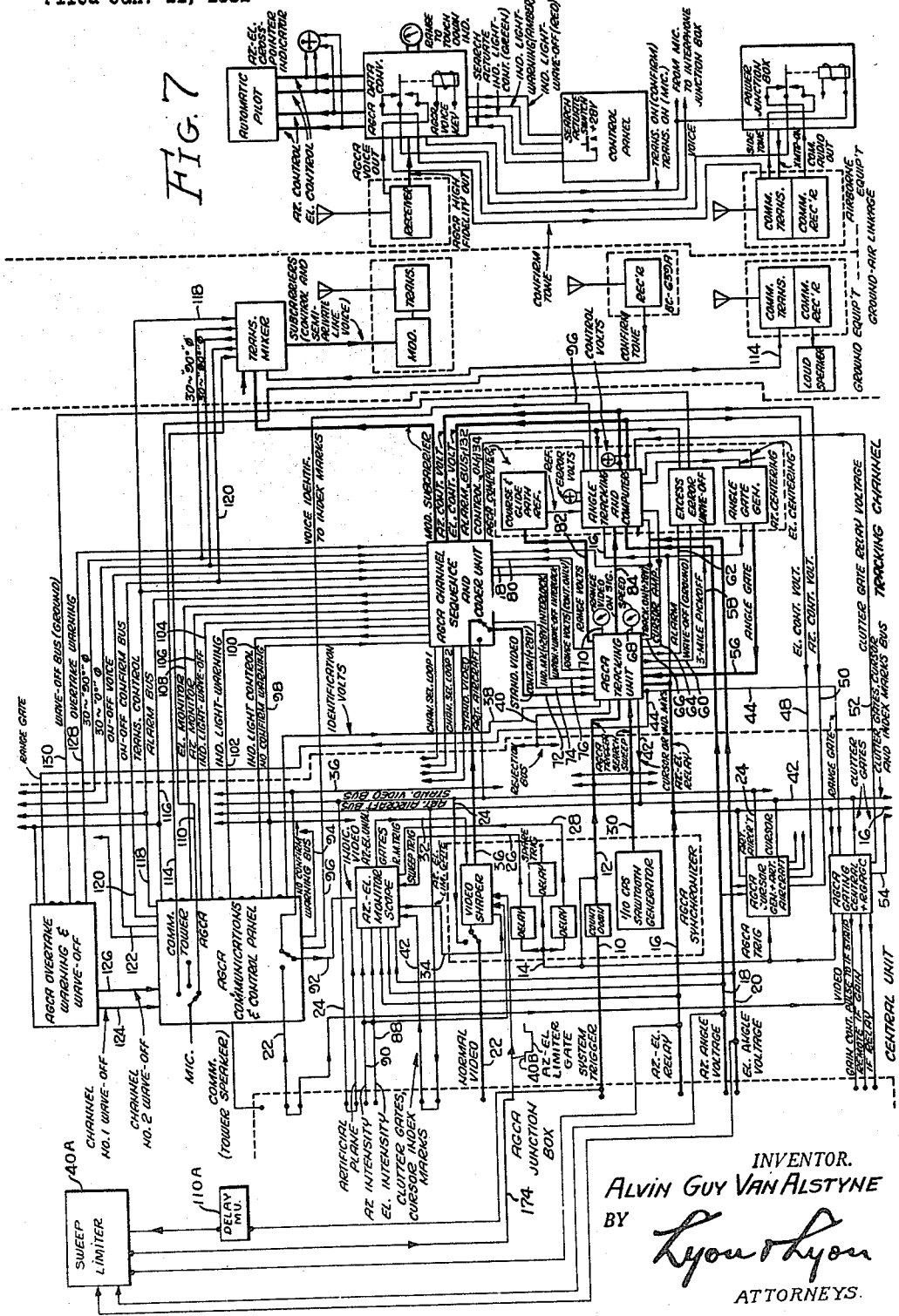

Nov. 22, 1960
A. G. VAN ALSTYNE
2,961,650
RANGE AND ANGLE TRACKING OF AIRCRAFT USING ANGLE GATED VIDEO
Filed Jan. 11, 1952
11 Sheets-Sheet 4
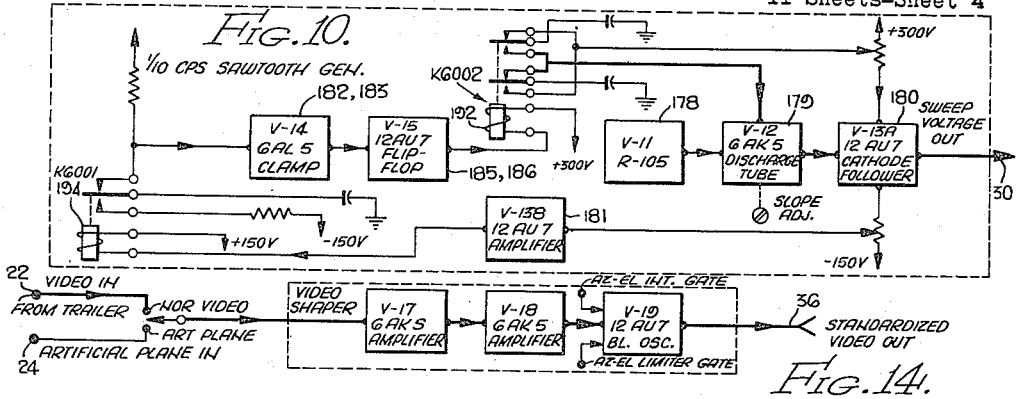
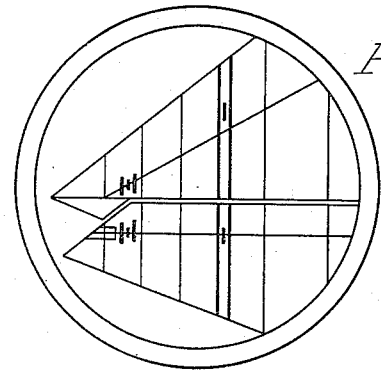
Fig. 15.
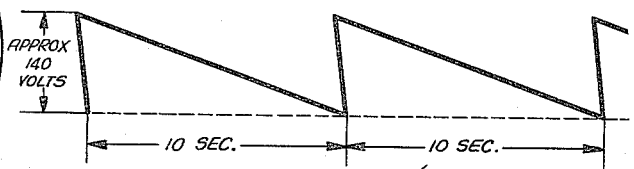
Fig. 11.
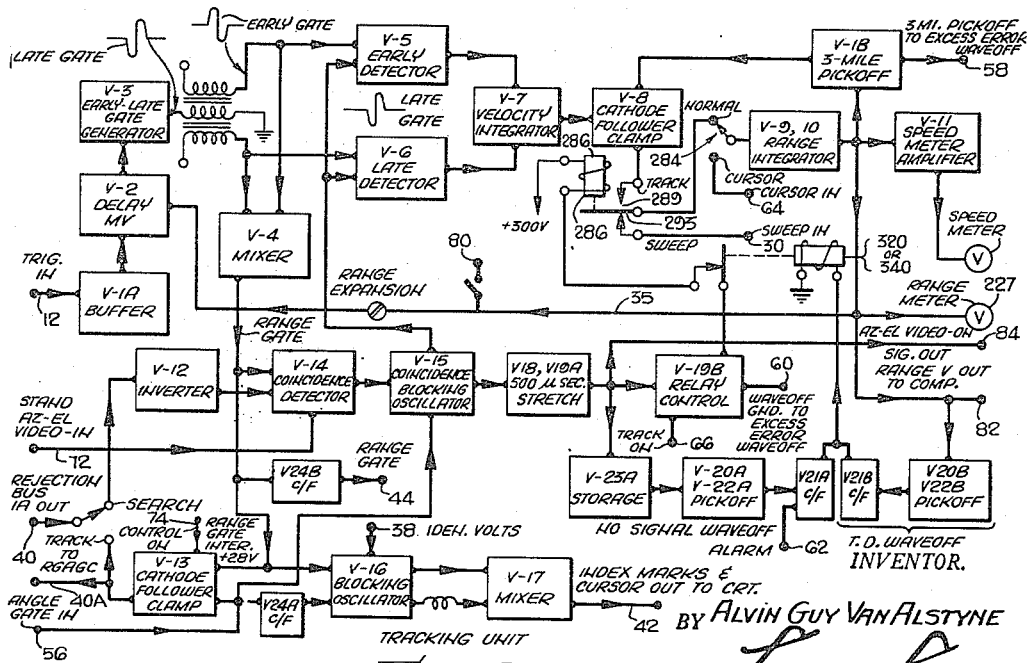
INVENTOR.
BY ALVIN GUY VAN ALSTYNE
Lyon & Lyon
ATTORNEYS

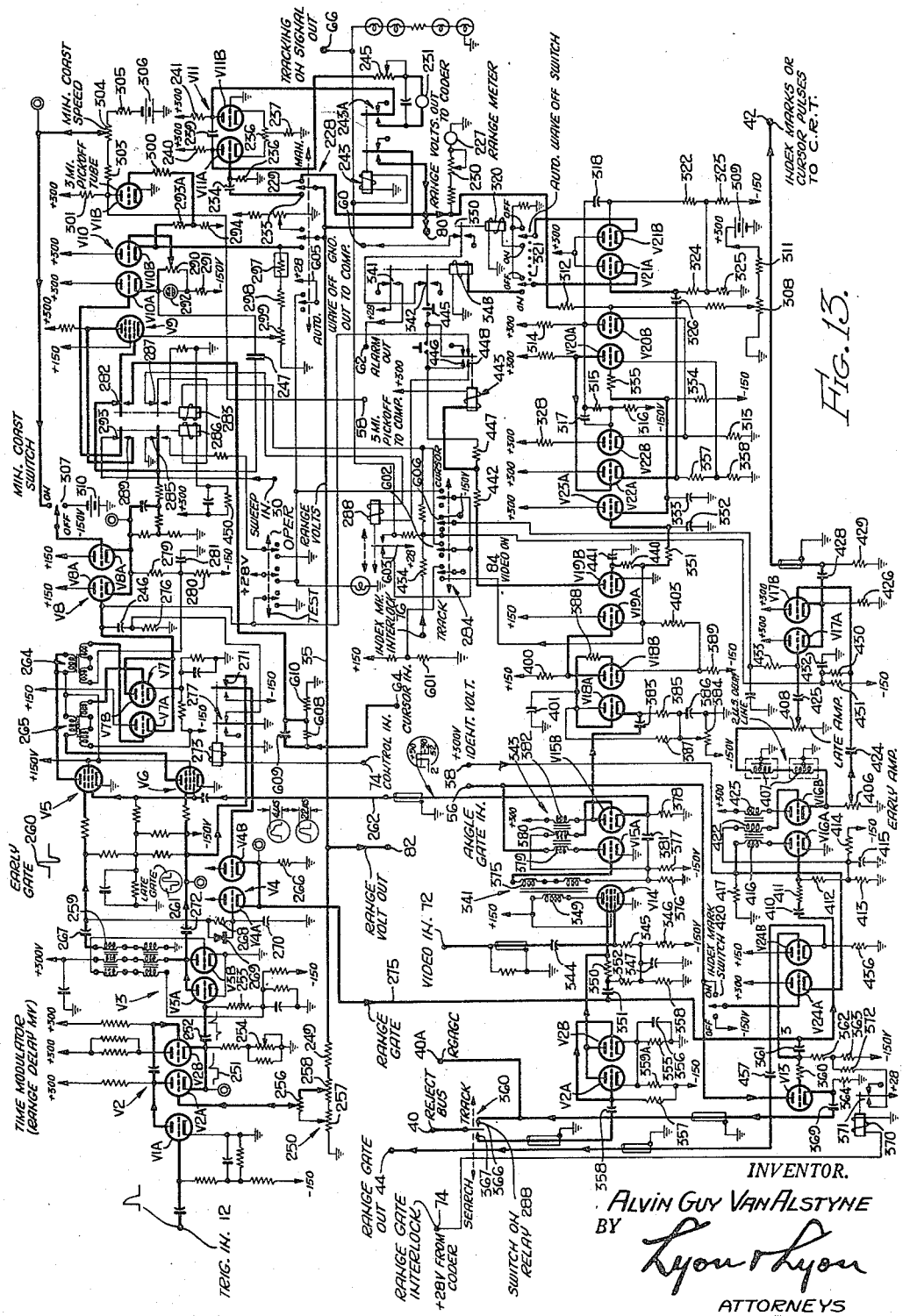

INVENTOR.
ALVIN GUY VAN ALSTYNE

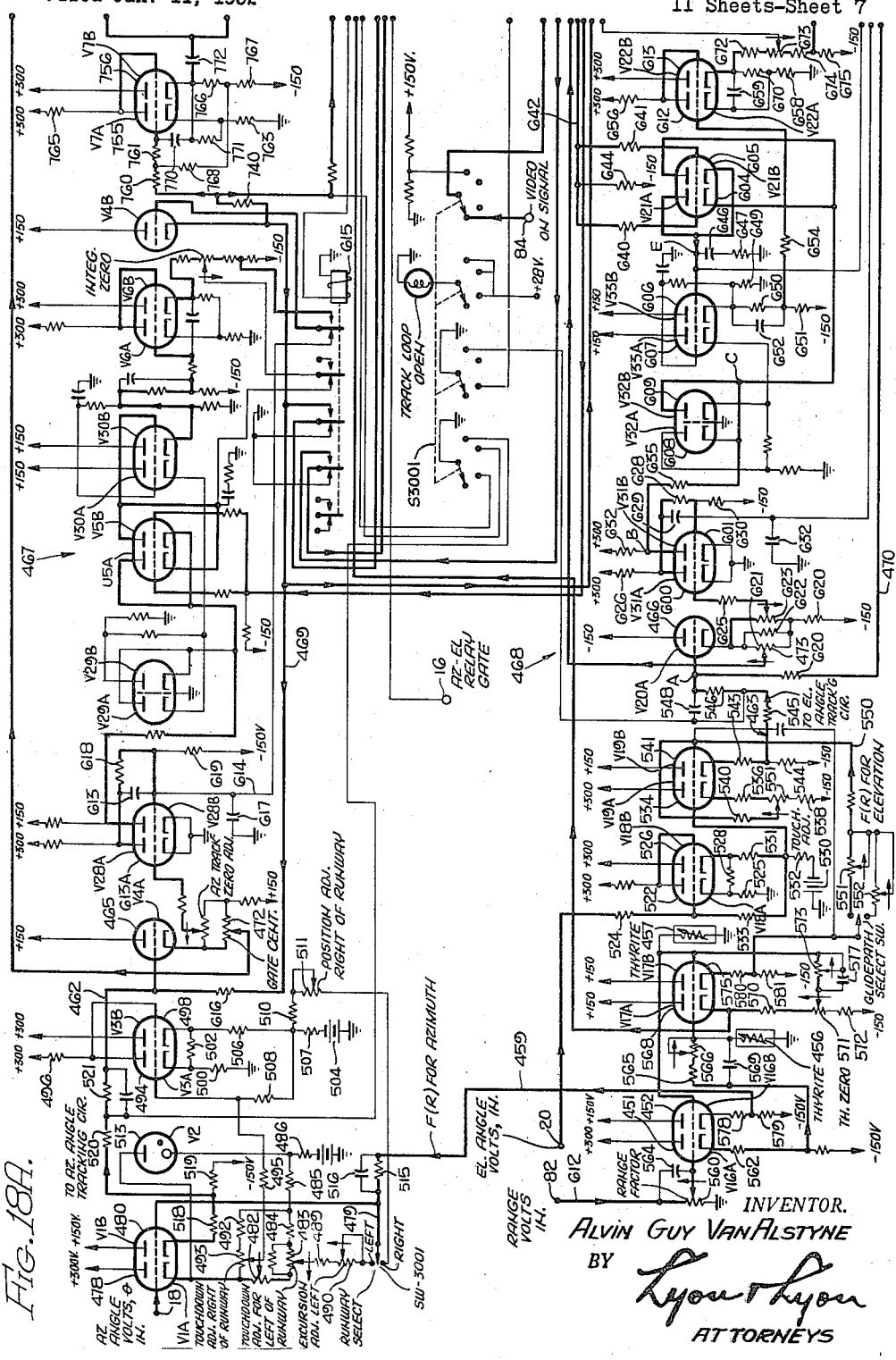

Nov. 22, 1960
A. G. VAN ALSTYNE
2,961,650
RANGE AND ANGLE TRACKING OF AIRCRAFT USING ANGLE GATED VIDEO
Filed Jan. 11, 1952
11 Sheets-Sheet 10
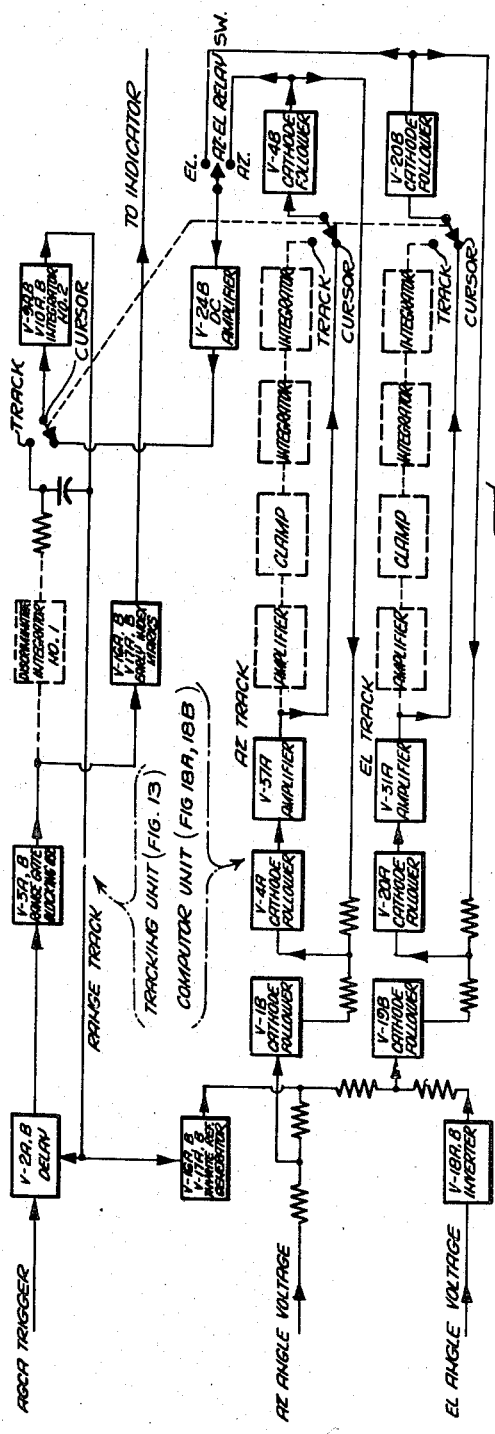
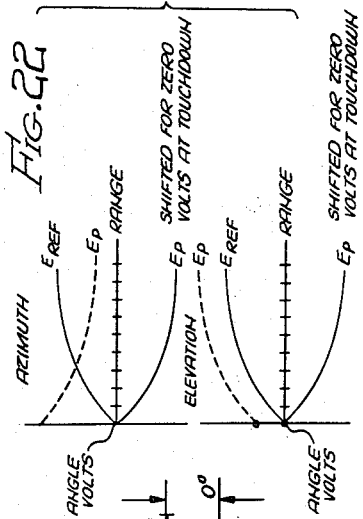
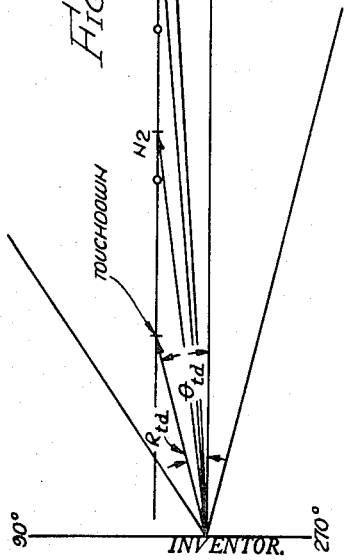
INVENTOR.
ALVIN GUY VAN ALSTYNE
BY
ATTORNEYS Nov. 22, 1960  A. G. VAN ALSTYNE  2,961,650
RANGE AND ANGLE TRACKING OF AIRCRAFT USING ANGLE GATED VIDEO
Filed Jan. 11, 1952  11 Sheets-Sheet 11

INVENTOR.
ALVIN GUY VAN ALSTYNE
BY
ATTORNEYS

United States Patent Office 2,961,650
Patented Nov. 22, 1960

2,961,650

RANGE AND ANGLE TRACKING OF AIRCRAFT USING ANGLE GATED VIDEO

Alvin Guy Van Alstyne, Los Angeles, Calif., assignor to Gilfillin Bros. Inc., Los Angeles, Calif., a corporation of California Filed Jan. 11, 1952, Ser. No. 265,977

9 Claims. (Cl. 343—7.3)

The present invention relates to improved means and techniques for tracking objects in the course of their flight; and in particular, relates to means and techniques for tracking the flight of aircraft in the approach zone to a landing field while a radar antenna beam scans such zone, and for developing information, while such tracking occurs, as to the deviation, both in elevation and in azimuth, of such aircraft from a predetermined glidepath and course line.

The present arrangement constitutes an improvement or extension of the concepts and means described and claimed in my co-pending patent application, Serial No. 244,111, filed August 29, 1951, now U.S. Letters Patent 2,795,781, issued June 11, 1957, and assigned to the same assignee, such co-pending application relating to means and techniques whereby an aircraft may be "acquired" by a range tracking circuit which incorporates a servo loop, such servo loop, after aircraft acquisition, serving to track the flight of an aircraft with respect to range.

Similar apparatus for these purposes are also described in the present application, however, with related means for developing information as to the deviation of the tracked aircraft from a predetermined glidepath in the vertical plane and from a predetermined course line in the horizontal plane.

This information thus developed, in the form of error signals, is transmitted to the aircraft equipped with an auto-pilot for controlling the flight of such aircraft with such control signals in such a manner as to maintain, or tend to maintain, the aircraft on such glidepath and course line.

For this purpose, the present arrangement incorporates means for tracking the aircraft not only in range, but also with respect to angular deviation from a predetermined glidepath and course line, such range tracking and angle tracking means being featured by the fact that they each utilize a servo loop, the servo loop for range tracking serving to develop a voltage which is representative of the range of the tracked aircraft, while the servo loop for angle tracking serves uniquely to track the aircraft with respect to a predetermined glidepath or course line, as the case may be, by providing averaged data, which is based on giving weight to all radar "hits" on the aircraft.

In this process, while the position of the aircraft is constantly being compared with its ideal position along such predetermined glidepath and course line, an angle gate is developed which is used to gate the video being supplied to the range tracking means so as to assure obtainance of data of only those objects which are near the aircraft's angular position whether or not the aircraft is on course.

The present arrangement is particularly adapted for both range and angle tracking a plurality of aircraft simultaneously, while a radar antenna beam sweeps through the approach zone to an aircraft landing field.

The object of the present invention is therefore to provide means and teachings whereby the results indicated above, may be obtained.

A specific object of the present invention is to provide improved apparatus for both range and angle tracking an object, such as an aircraft, in its flight, so as to obtain information as to its instantaneous range, speed, and angular deviation from a predetermined glidepath (extending in the vertical plane), and course line (which extends in a horizontal plane).

Another specific object of the present invention is to provide improved apparatus in which angle tracking is performed by weighing the number of pulses, i.e., radar "hits" in the angle envelope and selecting the area bisecting angle, so that random pulses amounting to, for example, 30% of the radar hits or echos within the angle envelope shall not seriously affect the tracking performance.

Another specific object of the present invention is to provide improved range tracking apparatus of this character featured by the fact that such range tracking apparatus is sensitive only to video, i.e., radar echoes returning from objects very close to an aircraft being tracked; a subsidiary feature of the present invention being that a so-called angle gate, developed for that purpose, is made as small as is consistent with accurate angle tracking.

Another specific object of the present invention is to provide improved apparatus of this character, which serves to be relatively immune to clutter effects thereby depending for that result, less on the moving target indicating means (MTI) usually associated with the radar echo receiving equipment.

Another specific object of the present invention, is to provide apparatus of this character suitable for angle tracking aircraft of diverse sizes and ranges, by assuring the obtainance of data representative of the center of the series of radar hits, i.e., echoes developed on such aircraft.

Another specific object of the present invention, is to provide improved range tracking means which, to aid in discrimination against clutter, is "tightened," i.e., made less sensitive to echoes from all sources, so that a specific number of antenna beam scans are required before an observed error is corrected, the number of scans being established by adjustment of the time constant of the error and velocity integration.

Another specific object of the present invention, is to provide apparatus of this character in which a so-called angle gate is developed substantially at the time radar echoes are expected from aircraft being tracked, such angle gate being used in the range tracking circuitry to prevent the tracking of undesired targets at the same range, but at varying angles from desired video.

Another specific object of the present invention, is to provide an improved range and angle tracking apparatus of this character, in which a plurality of aircraft may be range tracked simultaneously and signals developed, which represent the deviation of such aircraft from a predetermined glidepath and predetermined course line.

Another specific object of the present invention, is to provide improved range tracking apparatus of this character, in which during the "search" condition or function, a range gate is developed having a width of approximately 4 microseconds, such range gate however being automatically decreased to a width of approximately 2.2 microseconds, upon confirmation of ground control by an incoming aircraft, so that a wide gate is available for "acquiring" an aircraft in a reasonable time and so that a relatively narrow gate is available in tracking, for purposes of accuracy and exclusion of the effects of clutter.

Another specific object of the present invention, is to provide apparatus of this character which functions to "acquire" aircraft to provide automatic range tracking of the aircraft once it has been "acquired," to compute the deviation or error of the aircraft with respect to a predetermined glidepath and course line and with respect to the "center" of the series of radar "hits" or echoes developed by the radar equipment and to develop an angle gate of the character mentioned previously, for rendering the range tracking circuit effective or acceptable for control by incoming video during desired periods only.

Another specific object of the present invention is to provide improved apparatus of this character for range tracking aircraft and for developing a video-on signal, such apparatus incorporating also means for angle tracking the aircraft, which is receptive to information only during the occurrence of the video-on signal; and in turn, the angle tracking means develops an angle gate which renders the range tracking means receptive to incoming information only during the time echoes are expected from an aircraft being tracked.

Another specific object of the present invention is to provide an improved system of this character in which the video envelope of an aircraft is compared with the antenna beam angle voltage so as to derive a continuous voltage which, at any one particular time, represents the angular position of the aircraft with respect to the situs of the radar equipment, whereby such continuous voltage is used for steering the aircraft automatically on a predetermined glidepath or course line.

Another specific object of the present invention is to provide an improved closed electronic servo loop for the general purposes mentioned in the preceding paragraph, such servo loop including a unique configuration of samplers and integrators.

Another specific object of the present invention is to provide an improved servo loop of the character mentioned in the preceding paragraph which serves to generate a step function at the time the antenna beam angle voltage (which serves as a measure of the position of the radiated antenna beam) corresponds to the position of an aircraft being tracked, the video envelope of the aircraft being applied to the servo loop so as to effect operation of a sampler, such sampler admitting a positive charge to a first integrator during the time that the video envelope occurs on the high side of the step, and a negative charge during the time that the video envelope occurs on the low side of the step. The first integrator in such case integrates the areas under the positive and negative portions of the video envelope, and if any asymmetry exists, the output of such first integrator is other than zero, causing the second integrator to act in such a way as to center the aforementioned step on the video envelope.

Thus, the output of the second integrator, which is the voltage compared with the angle voltage to form a step, represents the angular position of the aircraft, though having a negative polarity.

The use of double integration results in velocity memory in angle tracking since the output of the first integrator is a voltage representing the angular velocity of the aircraft; and, in the absence of data, i.e., video envelopes, this voltage does not change.

Figure 1 shows in schematic form apparatus for scanning the approach zone to an aircraft landing field with related circuitry for producing a visual indication of the character illustrated in Figure 6; also, this apparatus serves to develop information such as azimuth angle voltage, elevation angle voltage, video, blanking voltages and az.-el. relay voltages used in the automatic ground controlled approach (AGCA) system illustrated in Figure 7.

Figure 2 shows azimuth beam angle voltage, elevation beam angle voltage, as well as inverted elevation beam angle voltage, and their variations with respect to time as developed by the apparatus shown in Figure 1.

Figure 3 shows a cycle of operation of the radar scanning and indicating arrangements in Figure 1 and serves to illustrate the period during which the az.-el. relay voltage is available.

Figure 4 illustrates other voltages developed during cyclical operation of the apparatus illustrated in Figure 1.

Figure 5 illustrates more detail of the cathode beam centering means shown in block form in Figure 1, such circuitry being effective to shift the displays in Figure 6 sequentially from one origin position O–1 to the other origin position O–2 and from O–2 to O–1, etc.

Figure 6 illustrates the display obtained using the apparatus illustrated in Figure 1, the elevation and azimuth displays being produced sequentially on a time sharing basis.

Figure 7 is a block diagram of an AGCA system embodying features of the present invention which is supplied with certain information developed by the apparatus illustrated in Figure 1.

Figure 8 illustrates in schematic form circuitry of the video shaper which is indicated as such in Figure 7 and which is indicated in block diagram form in Figure 14.

Figure 9 illustrates the circuitry of the one-tenth cycle per second sawtooth generator which is also illustrated as such in block form in Figure 7, such sawtooth generator producing a sawtooth voltage wave of the character illustrated in Figure 11, which is used during the so-called "search" function of the AGCA equipment, it being noted that the circuitry of Figure 9 is illustrated in block form in Figure 10.

Figure 10 illustrates in block diagram form the circuitry illustrated in Figure 9.

Figure 11 illustrates the sawtooth wave form developed by the apparatus illustrated in Figures 9 and 10.

Figure 12 illustrates in block diagram form the circuitry of the AGCA tracking unit indicated as such in Figure 7, such circuitry being illustrated in detail in Figure 13.

Figure 13 represents in schematic form the circuitry of the AGCA tracking unit illustrated in Figures 7 and 12.

Figure 14 illustrates in block diagram form the circuitry of the video shaper, the circuitry of which is illustrated in Figure 8, the video shaper also being indicated as such in Figure 7.

Figure 15 serves to illustrate the visual indication obtained of an aircraft being tracked, with the bracketing index marks in one instance being limited by angle gating, while in the other instance being extended in the absence of angle gating.

Figure 16:
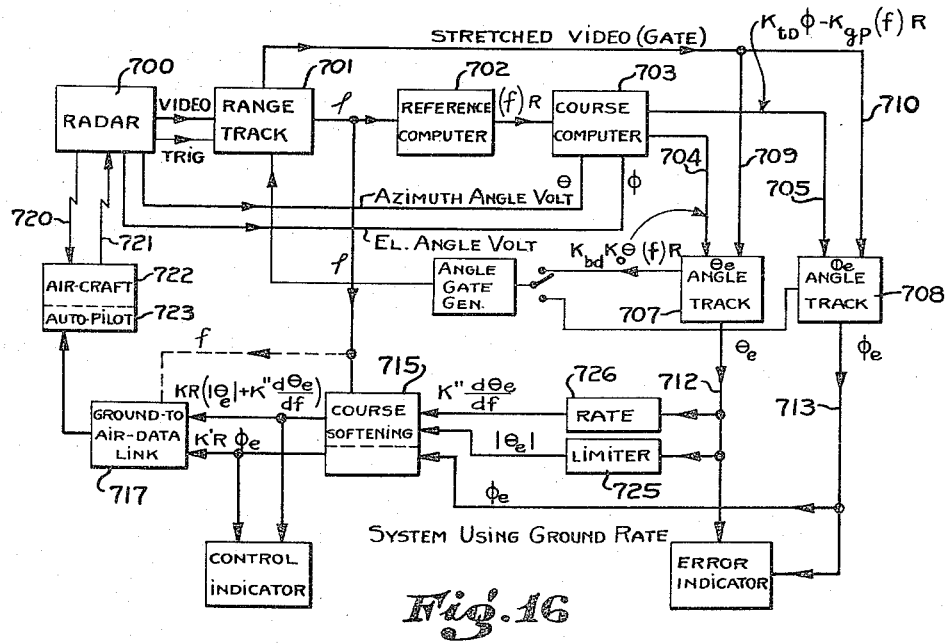
Figure 17:
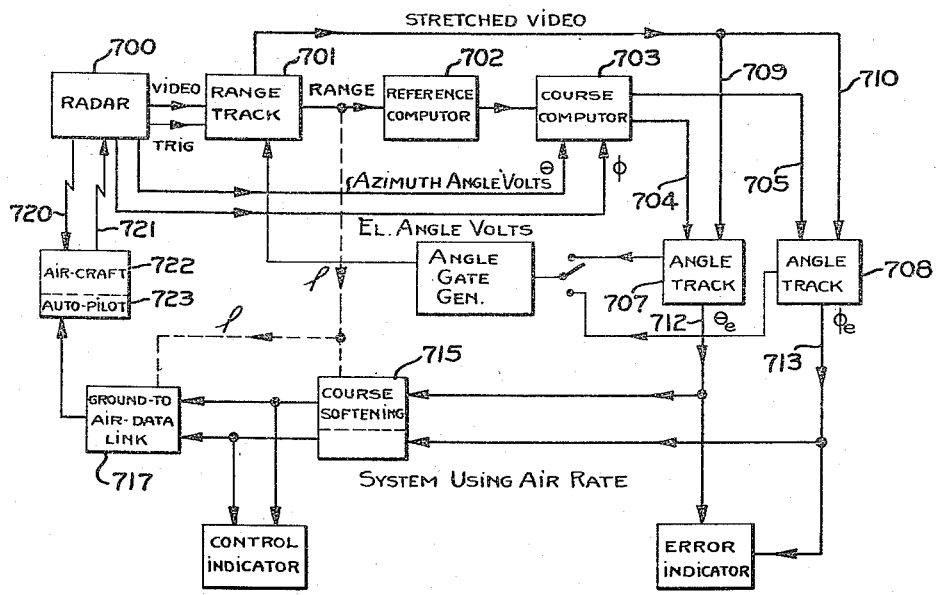

Figures 16 and 17 illustrate in block diagram form different elements of the AGCA system and their functional inter-relationship when the system is adjusted respectively to use ground rate and air rate information.

Figure 18B:
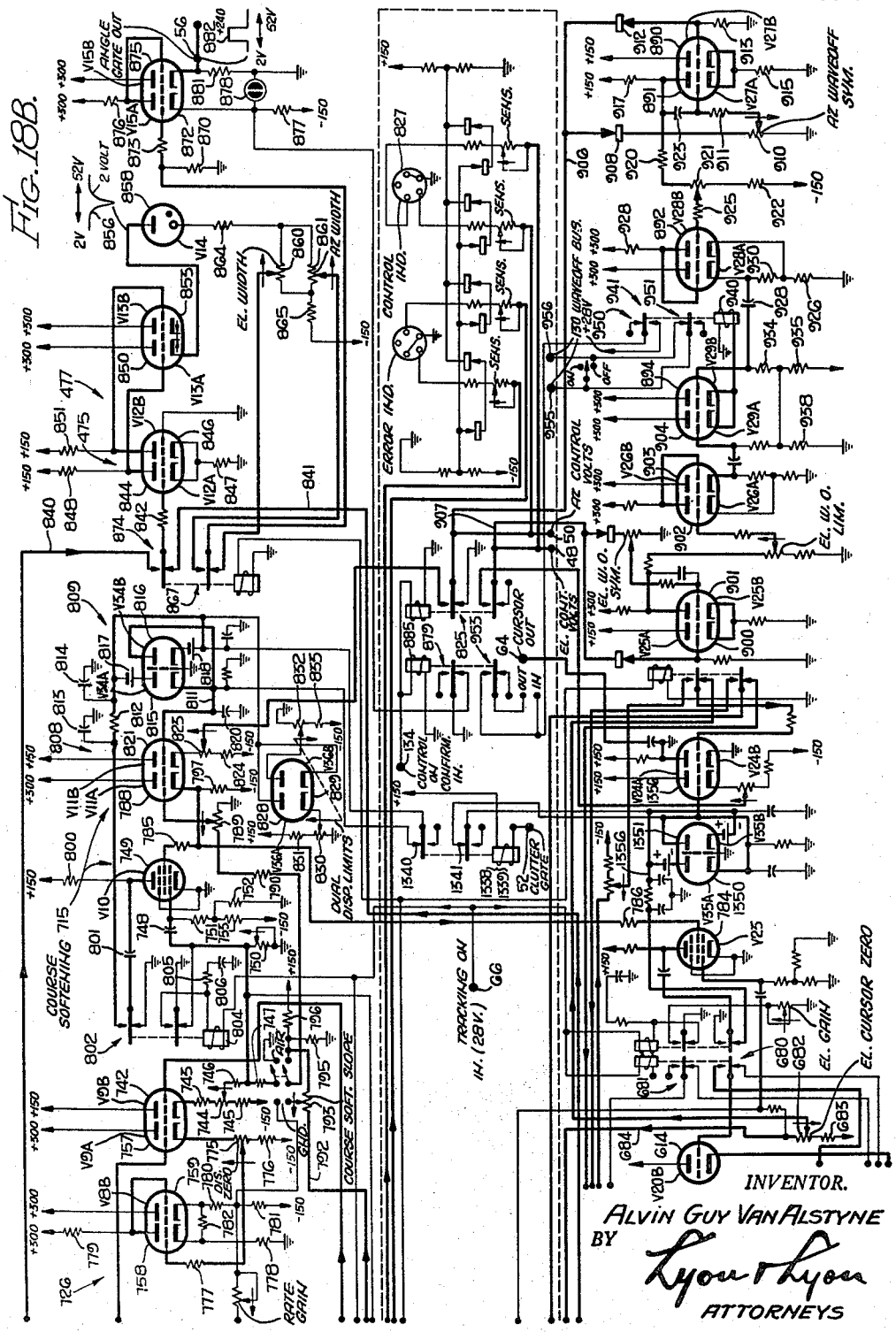
Figure 19:
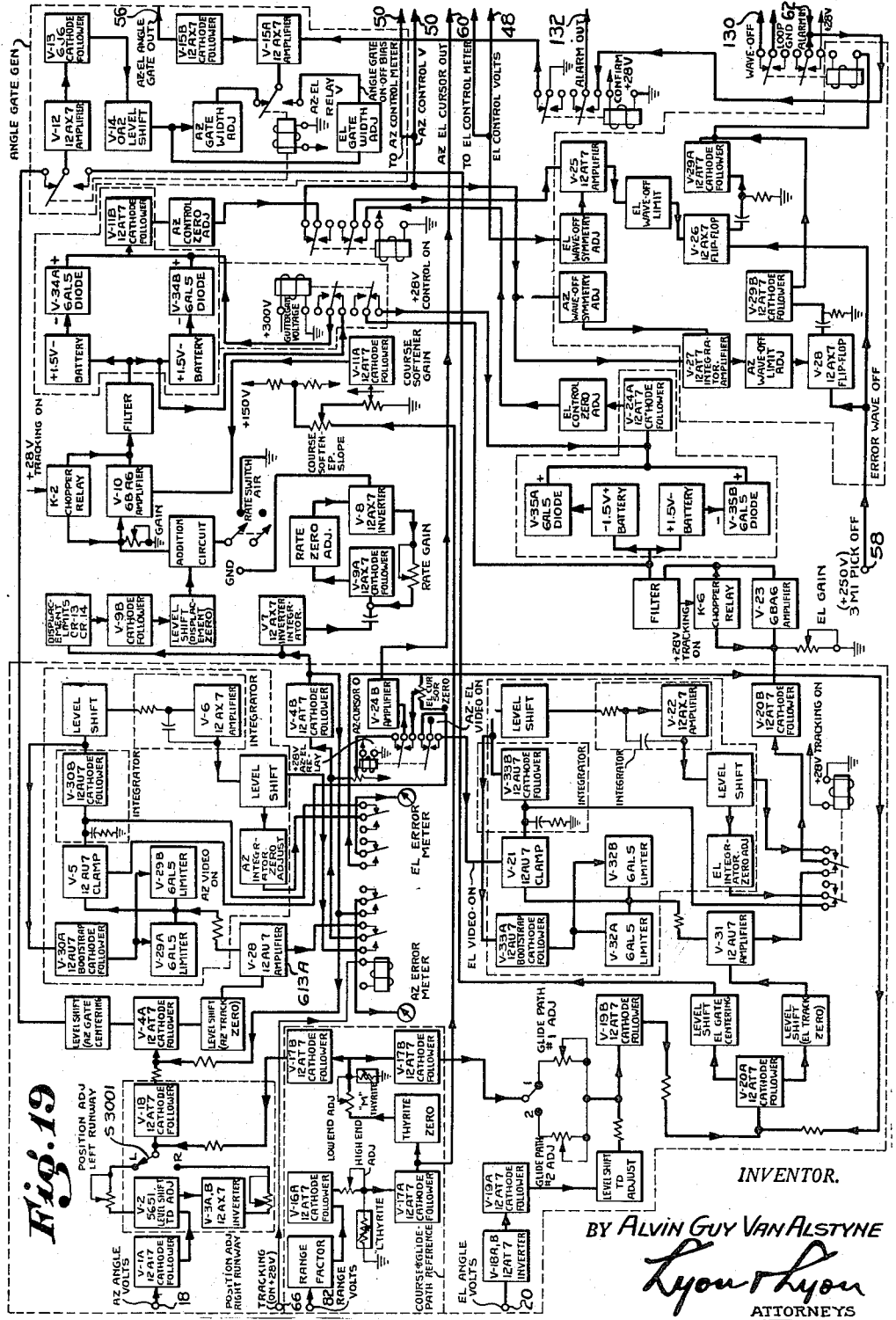

Figures 18A and 18B interconnected as illustrated constitute Figure 18, which is a schematic representation of the apparatus in the angle tracking and computer unit illustrated as such in Figure 7, such circuitry of Figures 18A, 18B being illustrated also in block diagram form in Figure 19.

Figure 20 illustrates the character of the "stretched" video or video "on" signal, such signal constituting in general an elongated wave having a time duration equal to the time during which radar "hits" are being made on an aircraft plus a fixed time interval in the order of 500 microseconds.

Figure 21 illustrates the geometrical conditions existing in the azimuth plane, with the radar equipment located adjacent the runway center line and in relationship to the touchdown point, such figure being useful in appreciating features of the computer illustrated in Figures 18A, 18B, and Figure 19.

Figure 22 is useful in explaining the manner in which the azimuth and elevation beam angle voltages are modified as a function of range for purposes of comparison with a reference voltage developed in the computer unit.

Figure 23 illustrates the manner in which the circuitry in the tracking unit and computer unit is modified so as to provide a visual reproduction on the cathode ray tube of both the azimuth course line and elevation glidepath, which are computed by using thyrite elements in the normal operation of the computer unit.

Figure 24:
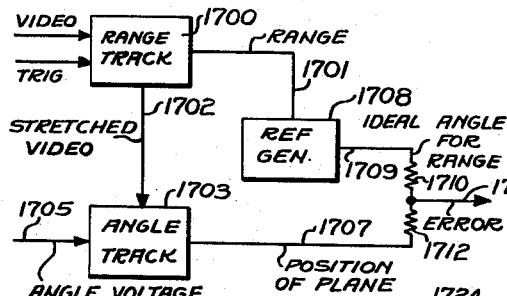

Figure 24 illustrates a modified arrangement and is useful in illustrating certain concepts present in the AGCA system.

Figure 25:
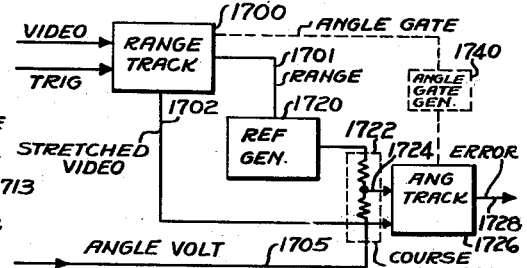

Figure 25 is a block diagram similar to Figure 24 and serves to illustrate the functional relationship of certain units of the AGCA equipment.

Figure 26:
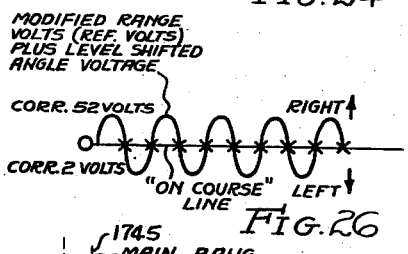

Figure 26 illustrates the type of voltage variation produced in the computing unit, the crossover points of which represent an ideal glidepath and course line.

Figure 27:
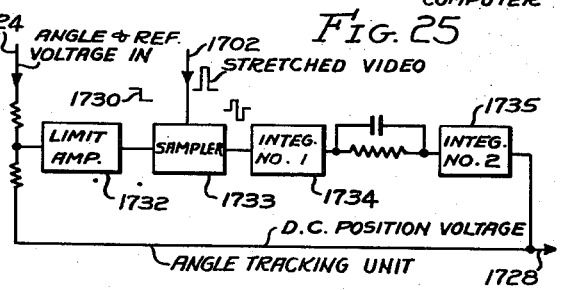

Figure 27 shows in block diagram form certain circuitry of the computer unit illustrated in Figure 18B and is useful in illustrating the manner in which error tracking is accomplished, using a servo loop.

Figure 28:
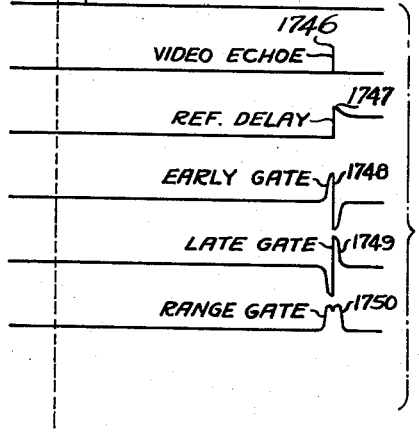

Figure 28 is useful in illustrating the time sequence of certain control signals and gates and echoes in relationship to the main bang or transmitted pulse in the range tracking unit.

*Means shown in Figures 1–5 for producing information useful in producing both visual indications and tracking*

The apparatus shown in Figure 1 is connected both to the apparatus shown therein for producing visual indications on the face of a cathode ray tube 11 of the character shown in Figure 6 and for also supplying certain data to the automatic tracking apparatus shown in block diagram in Figure 7.

In Figure 1, the synchronizer 31 serves to generate timing pulses which are used to time the application of pulses to the transmitter 33 to initiate its operation. The transmitter stage 33, pulsed at a constant repetition rate of, for example, 2000 or 5500 pulses per second consists of, for example a magnetron oscillator with a characteristic frequency of about 10,000 megacycles. The output of the transmitter stage 33 is transferred to either the elevation (el.) antenna 103 or the azimuth (az.) antenna 55, depending upon the position of the motor driven interrupter or radio frequency switch 101. The transmit-receiver (T–R) switch 97 prevents power from the transmitter 33 from being applied directly to the receiver 57. This transmit-receive switch 97, as is well known in the art, allows low intensity signals, such as a train of resulting echo signals received on the antennas 103, 55, to be transferred to the input terminals of the receiver 57. This deflection of energy from the transmitter 33 to the antennas 55, 103, accomplished by operation of switch 101, occurs at a rate of approximately two per second so that in effect the component antennas obtain four "looks" per second of the space scanned.

The resulting antenna beams are caused to move angularly, i.e., to scan upon rotation of the shaft 93. The switch 101 is rotated twice per second, and while energy is being transmitted to one of the antennas 55, 103, the resulting electromagnetic beam projected into space is caused to scan such space. The means whereby such scanning movement of the projected electromagnetic beam is obtained may be of the type described in the copending application of Karl A. Allebach, Serial No. 49,910, filed September 18, 1948, now Patent No. 2,596,113, patented May 13, 1952, for bridge type precision antenna structure, which depends for its operation on the use of a variable wave guide type of antenna. This particular means, per se, forms no part of the present invention, and so far as the aspects of the present invention are concerned, the antenna scanning beam may be produced by moving the entire antenna through a relatively small arc of a circle. Actually, in fact, the azimuth antenna beam may scan first in one direction and then in the other, waiting after each scan while the elevation beam completes a scan in elevation. The azimuth antenna 55 scans a fixed horizontal angle of 20°, and is so placed as to include the approach course to a given airfield runway. Vertical scan of the elevation antenna 103 is from minus one degree to plus 6 degrees.

While in any position during the part of the cycle in which the relay frequency switch 101 allows the flow of energy into the elevation antenna 103, the elevation antenna beam is electrically scanned in elevation. The position of the elevation antenna beam is measured by means of a variable capacitor 59, one plate of which is attached to the beam scanner of elevation antenna 103 and varied in accordance therewith, such capacitor 59 comprising one part of a capacitive potentiometer and contained in the angle coupling unit 85 which may be of the type described and claimed in the copending patent application of Clarence V. Crane, Serial No. 212,114, filed February 21, 1951, now U.S. Patent No. 2,650,358, issued August 25, 1953. The angle coupling unit 85 thus used with capacitor 59 is useful in developing the elevation beam voltage represented as 61 in Figure 2.

Similarly, the angle in azimuth of the radiated azimuth antenna beam is measured by the angle capacitor 65 in the azimuth angle coupling unit 63A, operating synchronously with the scanner of the azimuth antenna 55. Such variation in azimuth angle voltage as a function of the particular angular position of the azimuth antenna beam is represented by cyclically varying voltage 63 shown in Figure 2. It is observed that these voltage variations Nos. 61 and 63 have portions thereof shown in heavy lines, and it is these portions which are used to effect control operations and which are selected by means mentioned later. Figure 2 also shows inverted azimuth elevation beam angle voltage as represented by the oblique lines 67A.

Also coupled to the scanner of the elevation antenna 103 is the elevation unblanking switch 67, which has one of its terminals connected to the continuous voltage source 91 for purposes of developing an elevation unblanking voltage gate, shown in Figure 4, so timed that its positive value corresponds to the time of effective scanning of the elevation antenna beam. The azimuth unblanking switch 65A is similarly coupled to the scanner of azimuth antenna 55 with one of its terminals connected to the continuous voltage source 65B for purposes of developing azimuth unblanking voltage (Figure 4) so timed that the positive portions of such voltage corresponds to the time of effective scanning of the azimuth antenna beam. Relay switch 69 operates at substantially the same time as switch 65A, and synchronously therewith and serves to generate the so-called az.-el. relay voltage or gate (Figure 4), which is so timed that its positive portion begins at a time just prior to the beginning of the azimuth unblanking voltage and just after the end of elevation unblanking voltage, and which ends at a time just after the ending of the azimuth unblanking voltage and just prior to the beginning of the elevation unblanking voltage, all as seen in Figure 4.

Figure 3 shows a schematic diagram of the time relations involved in a scanning action which, typically, occupies a time in the order of one second. Forward progress of time is represented by clockwise motion about this diagram. The central circular region of Figure 3 marked N shows the time schedule of the scanning operations of the two systems, opposite quadratures being scanned by the same system but carried out in opposite directions. The shaded areas (each comprising approximately 10 degrees of the complete 360 degree cycle) represent the periods during which the transmitter 33 is switched by the switch 101 in Figure 1 from one antenna to the other antenna. Unshaded areas of region N represent the time periods during which one or the other of the antennas is in use, sending out radio frequency pulses and received reflected echo signals from objects within the field of coverage of the beam. Shaded areas indicate inactive periods during which switching takes place, both antennas being momentarily isolated from the transmitter and receiver.

The inner annular region M of Figure 3 represents the time schedule of the related azimuth and elevation displays, subject however to pattern clipping described later, and corresponds to the cyclical variations of azimuth and elevation voltages represented in Figure 2.

The outer annular region of Figure 3, marked L, shows the time schedule of currents through the various coils of a number of so-called az.-el. switching relays for effecting time sharing. The relay actuating current is obtained by the switch 69 (Figure 2) operating in synchronism with the mechanism producing azimuth antenna beam scanning.

More specifically, in Figure 1, the wave guide transmission line 79 leads from the transmitter 33 and receiving system 97, 57. A T-joint 71 divides this transmission line into two branches 73 and 95, leading through switch assembly 101 to the elevation and azimuth assemblies 103 and 55, respectively. These branches have suitably placed shutter slots which receive the rotating shutters 75 and 75A, respectively. These are mounted on the common drive shaft 93, driven by the motor 77, and have two blades each arranged in opposite fashion, so that when one antenna transmission branch is opened the other will be blocked by its shutter. The shutter blades cover angles of approximately 100 degrees, leaving openings of 80 degrees as required by region N of Figure 3.

As mentioned previously, the same drive shaft 93 operates the two antenna beam scanning mechanisms represented by the dotted lines 99, 79, and assumed to be of the same construction as the above mentioned Allebach application and built into the antenna assemblies. In the showing of Figure 1 the eccentric cams 83, 81 on shaft 93 operate the same scanning mechanism. Since each of the cams 83, 81 has one lobe, while its associated shutter 75A or 75 has two lobes, one opening in the shutter will find the antenna scanning in one direction, the other in the opposite direction. The azimuth and elevation unblanking switches 75A and 67 are shown schematically in Figure 1 as being cam actuated, being operated by the two-lobed cam 89, for purposes of establishing the unblanking or intensifying voltages represented in Figure 4.

The az.-el. relay switch 69 is operated by the cam 87 on shaft 93 to control current to the circuit switching relays, the junction of which is described hereinafter.

Radar echo signals, when received at the elevation antenna 193 or the azimuth antenna 55, as the case may be, are fed back into the switch 101 and passed through the T-R switch 97 into the receiver 57. Receiver 57 serves to detect the video and after the video is amplified in the video amplifier stage 107, it is applied as so-called normal video to the correspondingly designated leads 22 in both Figures 2 and 7. Such video, i.e., radar video, derived from echo signals may be applied directly to the cathode of the cathode ray tube 11 shown in Figure 1 for purposes of producing visual indications; or, such normal video may first be "standardized" by applying the same to the video shaper indicated as such in the block diagram shown in Figure 7 and described in greater detail with respect to Figure 8. It is understood that other means may be used for applying the video to an intensity control electrode of a cathode ray tube and, for example, the means and techniques described and claimed in the copending application of Landee et al., Serial No. 247,616, filed September 21, 1951, now U.S. Patent No. 2,796,603, issued June 18, 1957, and assigned to the same assignee, may be used for this purpose.

The cathode ray tube 11 in Figure 1 has a pair of magnetic deflection coils 22B, 22A, so arranged as to deflect the associated electronic beam substantially parallel to two mutually perpendicular axes, i.e., the so-called "time base" axis which is generally, although not exactly horizontal as viewed by the operator, and the so-called "expansion" axis which is generally vertical. In general, each basic trigger pulse developed in synchronizer 31 (Figure 2) is made to initiate a current wave of sawtooth form through the time base deflection coil 22B and a current wave of similar form through the associated expansion deflection coil 22A, the current in each coil expanding approximately linearly with time and then returning rapidly to zero. Instead of a linear variation, this variation may be logarithmic in character as described in the above mentioned Homer G. Tasker application, Serial No. 175,168, filed July 21, 1950, now U.S. Patent No. 2,737,654, issued March 6, 1956, and assigned to the same assignee as the present application.

The resulting rate of such sawtoothed current is of course the same as, or a fractional multiple of, the pulse repetition rate of the transmitted radar pulses and occurs during the expectant period of resulting echo signals. It will be understood that electrostatic deflection of the cathode ray beam may be used instead of electromagnetic deflection, appropriate modification being made in other parts of the equipment.

Such sawtooth currents applied to the deflection coils 22B, 22A, however, are "modulated" at a much lower rate by currents of much lower periodicity which are produced by the aforementioned beam angle voltages shown in Figure 2. Those portions of the voltage indicated in heavy lines in Figure 2 only are used to modulate the voltages on a time sharing basis.

These voltages as represented by the curves 61, 63, may vary from plus 2 volts at one extreme of the scanning range to plus 52 volts at the other end. These particular antenna beam angle voltages as mentioned previously are used in effect to "modulate" an amplitude of the sawtooth voltage waves developed at the sweep amplifier shown in Figure 2 and applied at a much higher repetition rate to the expansion coil 22A, for purpose of obtaining so-called uni-directional or uni-dimensional magnitudes in the cathode ray display, in accordance with the principles set forth in the copending application of Homer G. Tasker, Serial No. 680,604, filed July 1, 1946, now abandoned, and assigned to the same assignee as the present application. On the other hand, the amplitude of the sawtooth voltage waves developed at the sweep amplifier and applied to the other quadraturely acting timing based coil 22B is likewise modulated to a much smaller degree and in a different manner, for purposes of orientation. Thus the amplitude of the currents applied to coil 22A is automatically varied in accordance with antenna beam angle voltage, so that the angle which any particular cathode ray beam makes, corresponds, on an expanded scale, to the antenna beam voltage.

The tube 11 is rendered fully operative for producing visible indications only when a suitable intensifying voltage is applied to its grid 112G, bringing the tube approximately to cut off condition. A relatively small additional video signal applied to the cathode 112C then strengthens the cathode beam, making it momentarily visible on the screen as a dot, the position of which is determined by the currents flowing at that particular moment in the set of deflection coils 22A, 22B.

For purposes of developing the aforementioned suitable deflecting currents in the cathode ray deflection coils 22A, 22B, the sweep generating circuit shown in Figure 1 is applied with basic triggers originating in the synchronizer 31 and applied to lead 10. Such trigger is applied to the delay multivibrator and blocking oscillator stage 110A, the output of which is fed to the sweep generating multivibrator stage 111A. A negative gating voltage is generated in the stage 111A and fed to the expansion and time base modulator stages 112A, 123A, respectively, and from them in modulated form through the expansion and time base amplifiers 124A, 125A. The output of the amplifiers 124A, 125A in the form of essentially trapezoidal waves of appropriate amplitude are applied to the expansion deflection coil 22A and the time base deflection coil 22B, respectively, causing current pulses of substantially linear sawtooth form in the coils. Expansion and time base centering circuits 126A, 127A, are also connected to the deflection coils. The modulator stages 112A, 123A, for purposes of modulation, receive az.-el. antenna beam angle voltages via switches $m$ and $n$, respectively, of relay K1101.

With the relay unactuated (as shown) the elevation beam angle voltage appearing on the potentiometer resistance 134A is applied through switch $m$ to the expansion modulator 122A; and through potentiometer resistance 135A and inverter 135B and switch $n$ to the time base modulator 123A. After completion of the elevation scan, relay K1101 is energized through switch 69 breaking the elevation beam angle voltage connections just described, and connecting the azimuth beam angle voltage through potentiometer 136A and switch $m$ to the expansion modulator 122A, and through potentiometer 137A, inverter 131A and switch $n$ to the time base modulator 123A.

Thus the degree of modulation of sweep current, and hence the degree of angle expansion of the display shown in Figure 6 may be separately regulated for the azimuth display by adjustment of the potentiometer 135A, and for the elevation display by adjustment of the potentiometer 134A; and the degree of modulation of the time base sweep current, and hence the apparent angle between the range marks and the time base may be separately regulated for the azimuth display by adjustment of potentiometer 137A, and for the elevation display by adjustment of the potentiometer 136A.

The centering circuits 126A, 127A in Figure 1 are individually capable of two separate adjustments, one effective when relay K1102 is actuated (azimuth display) and one when the relay is unactuated (elevation display) to determine the position of the points $O_2$, $O_1$, respectively, in Figure 6. Thus the origins of azimuth and elevation displays are separately adjustable, the centering circuits automatically responding to one or the other set of adjustments according to the energizing condition of relay K1102. A schematic diagram showing a centering circuit for this purpose is shown in Figure 5.

The deflection coil 22A in Figure 5 is connected between a 700-volt positive supply and two parallel circuits, one leading to ground through tube V–1116, which is the final stage of expansion amplifier 126A, and the other returning through choke coil L1101 and centering tube V–1117 to a 1,000-volt positive supply. The first of these two circuits feeds to deflection coil 22A, the periodically varying sweep producing component, while the second circuit provides a relatively constant but adjustable centering current component. The cathode resistor of centering tube V–1117 is made up of two parallel connected potentiometers 13 and 15, the movable contacts of which are connected respectively to the normally closed and normally open contacts of switch $m$ of relay K1102. A switch arm is connected through grid resistor 17 to the tube grid. The grid bias, and hence the centering current through the tube and through the coil 22A, thus depends upon the position of relay switch $m$ and is determined by the setting of the potentiometer 15 when relay K1102 is actuated (azimuth display) and by the potentiometer 13 when the relay is not actuated (elevation display). The two displays are therefore separately adjustable on the indicator tube by means of the two potentiometers.

The time base deflection coil 22B is provided with centering circuit which is identical to that in Figure 5 and functions in a like manner, controlled by switch $n$ of relay K1102. In fact, by appropriate changes of the numerals and lettering Figure 5 may be considered to illustrate the time base centering circuit. The potentiometers then provide separately adjusted ordinary elevation and azimuth displays with respect to the horizontal positions.

It is noted that the preferred interrelationship of the two displays in Figure 6 is such that the series of corresponding range marks of the two patterns lie in a straight line so that the two aircraft images 38A, 39A always lie in a line just parallel to the range mark lines, one directly above the other.

The azimuth and elevation displays shown in Figure 6 are limited so that they appear as shown, such pattern clipping or limiting being produced by operation of the pattern clipper or limiter 40A shown in Figure 1. Such sweep limiter 40A forms, per se, no part of the present invention and may be the one described and claimed in the copending patent application of Raymond B. Tasker, Serial No. 212,163, filed February 21, 1951, now Patent 2,663,868, patented December 22, 1953, and assigned to the same assignee. In general, the output of sweep limiter stage 40A is a negative-going gating voltage 40B applied to the first anode 19 of the cathode ray tube 11. Such negative-going gating voltage 40B is used for darkening, i.e., blanking out, the indications which may be otherwise visible. Such blanking occurs during undesired periods of sweep as now described specifically.

The azimuth display, which is preferably the lower one, is blanked or clipped or limited, above a horizontal line LM which extends parallel to the runway axis 150A and at a sufficient distance above it to allow for expected errors in the azimuth angle of approaching aircraft. In the elevation (upper) display, a section is cut out or clipped, such section being below the horizontal runway axis $O_1G$ and to the right of a short generally vertical line KJ. This line KJ is located just to the left of and parallel to the upper limiting sweep path $O_2L$ of the lower azimuth display. The region thus eliminated from the elevation display coresponds to space below the runway level.

Besides serving to produce this desired clipping in the visual display, the negative-going gating voltage 40B developed in the limiter stage 40A is useful in the automatic tracking system shown in block form in Figure 7 for limiting the time during which video is available in such automatic system. For that purpose gating voltage 40B is applied as shown therein to the "Video Shaper" for purposes of limiting the time during which standardized video is produced in the manner described hereinafter.

As shown in Figures 1 and 7 the input to the sweep limiter 40A is: (1) a trigger derived from the basic trigger appearing on lead 10; (2) the azimuth and elevation angle coupling voltages on leads 18 and 20 respectively; and (3) the az.-el. relay voltage on lead 16. It is understood that this negative gating voltage 40B appears at variable times along the time axis depending upon the magnitude of either the azimuth or elevation beam angle voltage, whichever one at that particular time is effective.

The purposes of the switches 300A, 300B shown in Figure 1 are fully described in the above mentioned application of Homer G. Tasker Serial No. 175,168 and for the present instance may be considered to remain closed.

It is observed further in connection with Figure 1 that the sweep multivibrator 111A generates a positive-going gating voltage 21 of a duration substantially equal to the time duration of the cathode beam sweep and such positive-going gating voltage is applied to the second mixer stage 23 to produce the wave form 25. This wave 25 comprises pulses of sweep frequency added to the longer azimuth and elevation gates which are developed in the first mixer stage 27 and shown also in Figure 4. This composite wave 25 is applied to the cathode ray grid 112G, bringing the tube up to the point of cut off during each sweep. By this expedient the cathode ray tube is conditioned for producing visual indication only during those times when video signals are being expected.

The range marks 40, 41, 43, 45, 47 and 49, shown in Figure 6, are developed by the range mark generator 41A (Figure 1) in accordance with basic triggers applied to such stage from lead 10. The range marks developed in stage 41A are applied to the cathode 112C.

It is observed that the display shown in Figure 6 includes sectors defined by the so-called V-follower lines 50A, 51A, and 52A, 53A, which sectors are developed using the apparatus connected to the leads in Figure 1 marked Az Servo Data No. 1, Az Servo Data No. 2, and El Servo Data No. 1 and El Servo Data No. 2, all in accordance with the teachings in the above mentioned copending application of Landee et al., Serial No. 247,616, filed September 21, 1951, now U.S. Patent No. 2,796,603, issued June 18, 1957.

Also Figure 6 shows the glidepath course line 149A and runway course line 150A. These two course lines may be developed electronically by apparatus described and claimed in copending application of Raymond B. Tasker and Burton Cutler, Serial No. 222,512, filed April 23, 1951, now U.S. Letters Patent 2,832,953, issued April 29, 1958, and assigned to the same assignee; or preferably these lines are obtained using the cursor generator illustrated in Figures 24 and 25 herein.

*Purpose and function of apparatus*

The apparatus described herein combines the functions of:

(1) Aircraft acquisition
(2) Automatic tracking
(3) Error computation and control signal transmission.

The controlled aircraft is equipped with suitable radio equipment and an autopilot with automatic approach coupler. This equipment may be used as an automatic ground controlled approach system (AGCA) for the simultaneous guidance of two or more aircraft during their approach to a given runway adjacent to which radar equipment is located for scanning the approach zone.

The radar system incorporates two antennas, one for scanning the approach zone in a vertical plane, and the other antenna scans the same approach zone in a horizontal plane. Vertical scan in from minus 1° to 6° while horizontal scan is in the order of 20°. In a system of this character, an approaching aircraft is first located by conventional search radar, using for example, a plan position indicator (PPI) and is then directed by radio communication to the correct position for entry into a predetermined ideal glidepath (vertical plane) and course line (horizontal plane). The final approach along such ideal glidepath and course line is indicated upon the face of a cathode ray tube and the actual course of the aircraft is visually compared with that of an ideal approach, such ideal approach, i.e., ideal glidepath and ideal course line being developed electronically by a so-called cursor generator.

In prior art systems of this character, radio communication is used to direct the aircraft along such ideal glidepaths and course lines; but in accordance with the present invention, means are provided for developing and transmitting to the aircraft, control signals which are representative of the deviation of the aircraft from such glidepath and course line for purposes of maintaining, or tending to maintain, the flight of such aircraft along such glidepath and course line.

For accomplishing such automatic control of aircraft, the AGCA system described herein is such as to receive information from conventional GCA radar equipment relative to the range azimuth and elevation positions of the approaching aircraft and to compare these positions with an ideal predetermined glidepath. The result of this comparison, in the form of error signals, is electronically computed and automatically sent to the controlled aircraft via very high frequency radio communication. AGCA airborne equipment receives this information (correction signals) and interprets it in the form of control voltages, which are applied to the aircraft's autopilot approach coupler.

The range of this automatically controlled approach is from approximately eight miles from the given landing field to a point of release from the system, known as touchdown. This point of release, or touchdown, is at an altitude of approximately fifty feet above the given landing strip; and at such a position of altitude that the pilot may assume control for the actual landing operation during the last few seconds of the landing.

Prior to the establishment of flight control of an approaching aircraft, communication between the AGCA installation and pilot of the incoming plane, may be effected via a conventional transmitter receiving system in the VHF band in the region of 140 megacycles.

Briefly, in operation of the AGCA system, the search radar operator, using the display of the conventional search radar (PPI) tracks the aircraft to a proper position altitude of the AGCA final approach. The entry into the AGCA system is along an "on course" approach line at a distance of approximately ten miles and at an elevation of approximately 2800 feet above the air field.

In the meantime, the radar equipment being energized, is in its "search" function or condition in which a slow search sweep voltage is periodically developed for searching a radar echo from the approaching aircraft. As a matter of fact, coincidence of a radar echo from such aircraft with such slow search sweep voltage notifies the system of an approaching aircraft; and thereupon the tracking unit, illustrated in Figure 13, automatically switches from such "search" function or condition to a "track" condition and displays the range and speed of the incoming aircraft. Simultaneously, upon switching from such search to track function, the AGCA transmitter is turned "on" and a sub-carrier on a transmitted wave, containing a so-called "channel select" key, is transmitted to the approaching aircraft. At a given range, or upon directions from the ground via conventional radio transmission, the pilot of the approaching aircraft renders effective his airborne decoder (signal data converter) by actuating a switch.

Actuation of such switch starts the search drive motor of the airborne decoder, and the output of the AGCA airborne receiver is searched for an AGCA sub-carrier. At intervals of 25 seconds, the AGCA ground transmitter is automatically interrupted for a one-second period. This interruption constitutes "interrogation."

If upon the "interrogation" the airborne decoder has located the transmitted sub-carrier, the signal interruption causes the detector to send a 4500 cycle per second "confirmation" signal to the ground via the airborne transmitter. This "confirmation" signal is received by the AGCA receiver and serves to energize relay windings to apply a plus 28 volt so-called "control" signal to a common bus of the ground equipment.

At the time the range tracking unit in Figure 13 automatically switches from its "search function" to its "track function" as described above, a so-called tracking "on" signal developed in the range tracking unit is applied to the computer unit illustrated in Figures 18A and 18B, so that a computer unit is conditioned to compute the error, if any, of the aircraft from the ideal glidepath and ideal course line.

Upon development of the confirmation "control" signal resulting from "confirmation" the AGCA transmitter is turned on to transmit to the aircraft the error signals computed by the unit shown in Figures 18A and 18B, as well as certain other information. Such error signals, i.e., azimuth and elevation control signals, as well as a signal representative of the instantaneous range of the aircraft, is used to modulate the sub-carrier transmitted to the aircraft, to provide the autopilot with correction signals for "on" course approach and providing the pilot with visual display instantaneous range from touchdown information.

The data, including control signals for effecting flight of the aircraft as well as other control signals, are transmitted from the ground to the aircraft by the use of a sub-carrier on the transmitted wave.

The AGCA system as developed includes a frequency spectrum which encompasses a carrier width sufficient for the control of six aircraft simultaneously. For this purpose, the AGCA carrier wave, transmitted in the region of 109 megacycles, includes a 30 cycle reference tone, a 3800 cycle voice band, and six positions for sub-carriers, equally spaced from 5 to 15 kilocycles upon the basic carrier, there being one sub-carrier for each of the six aircraft.

The 30 cycle reference tone originates in the AGCA transmitter mixer, and is used as a reference signal by an airborne decoder entering AGCA control. Such reference tone serves as a comparison for a 30 cycle phase shifted tone, included in all of the sub-carriers.

The voice band from 300 cycles to approximately 3800 cycles is included upon the basic carrier. This band is used to pass frequencies over the AGCA semi-private voice line upon the establishment of control, i.e., confirmation to the ground by the aircraft. Through a holding relay in the AGCA coder, voice communication between the ground installation and the aircraft's pilot is automatically available for a period of one minute after a "wave-off" signal (release of ground control) is transmitted from the ground; or, communication may be held for an indefinite period by the ground operator by the actuation of a control switch.

The six sub-carriers, equally spaced, may be included in the modulation of the basic carrier at frequencies from 5 to 15 kilocycles above and below the basic carrier frequency. In general, the AGCA coder circuitry serves to modulate a particular AGCA channel sub-carrier with control functions of azimuth error, elevation error and other functions enumerated below. This unit includes a sub-carrier oscillator, which develops the sub-carrier used in the particular control channel. The output of the oscillator is modulated by a square wave, generated within the coder unit, and the shifting of the frequency, amplitude, type and symmetry of this modulation is indicated in Figure 40.

The control functions modulating each sub-carrier and the methods of modulation, are as follows:

(1) Azimuth control of the aircraft is effected by frequency modulating the 30 cycle phase shifted signal included on the particular sub-carrier.

(2) Elevation control is obtained by using amplitude modulation by variation in symmetry of a square wave.

(3) The pilot of the aircraft is provided with information as to his range from touchdown, using amplitude modulation by varying the frequency of the square wave.

(4) A relay in the aircraft may be controlled from the ground for purposes of effecting voice communication and for that purpose amplitude modulation using 30% modulation by the square wave is employed.

(5) So-called "channel selection" is provided using 70% amplitude modulation by the square wave.

(6) Warning signals are transmitted to an approaching aircraft when his spacing to a preceding plane is below a predetermined minimum spacing and for that purpose, frequency modulation using variable deviation of the 30 cycle signal on the sub-carrier is employed, in such case a deviation of 180 cycles constitutes a warning signal.

(7) Also a "wave-off" signal may be transmitted to the aircraft, the wave-off being effected upon absence of 30 cycle modulation of the sub-carrier.

The AGCA system uses standardized video, i.e., the radar echo signals are shaped by measuring incoming radar echoes and utilizing all signals above a predetermined level to produce standardized pulses, such standardized pulses being of equal width and amplitude to assure consistent tracking performance.

Inasmuch as the antenna beams, i.e., the azimuth antenna and the elevation antenna beams scan through space on a time sharing basis, there are intervals during the scanning periods when there is no video. Moreover during one antenna scanning cycle radar hits, i.e., echo signals may be derived from a plurality of aircraft in the approach zone, some of the aircraft being larger than others and of course at different ranges from touchdown.

In view of these considerations, the AGCA system is provided with so-called range gated automatic gain control in the radar receiver, so as to maintain the gain of the receiver at a substantially constant level during scanning cycles.

For this purpose, the circuitry of the range gated automatic gain control measures the amplitude of radar echoes reaching the ground based equipment, and controls the gain of the intermediate frequency amplifier in the superheterodyne type radar receiver, in an inverse relationship. This circuitry includes adjustable "memory" and "learning" characteristics whereby the intermediate frequency gain control is partially dependent upon "remembered" input and whereby the rate of response to new input amplitudes may be varied.

The AGCA system incorporates certain safety features, one of such features being termed "control with warning," and results when the separation between any two tracked aircraft falls below a minimum preset value. This "control with warning" signal may be observed visually by warning lights at the ground equipment, and is also transmitted to the pilot of the overtaking aircraft. This "control with warning" signal is derived in the so-called overtake warning and wave-off unit, from data supplied thereto from two range tracking units of the type illustrated in Figure 13.

A second safety feature involves so-called error "wave-off" which is initiated through the failure of an aircraft to respond to AGCA control signals and the circuitry for this is illustrated in connection with Figures 18A and 18B.

A third safety feature which is related to the first mentioned safety feature, involves an excessive overtake condition. When an approaching aircraft overtakes a preceding aircraft by more than a pre-established distance, an error wave-off signal is transmitted to the aircraft to release the autopilot from AGCA control and effects the transmission of a maximum "fly-up" signal to the aircraft.

The aforementioned wave-off signals should not be confused with the normal wave-off signal transmitted to the aircraft. In a normal approach an automatic wave-off signal is transmitted to the aircraft indicating the return of flight control to the pilot for the final landing operation. One minute after the transmission of such normal wave-off signal, the particular control channel which causes tracking of the aircraft automatically returns to a "stand-by" condition so that it may automatically re-enter AGCA channel sequence cyclically.

It should be noted that a complete AGCA system includes, for each aircraft to be tracked in the approach zone, the following components: a range tracking unit of the character illustrated in Figure 13, a computer unit of the character illustrated in Figures 18A, 18B, a coder and sequencing unit of the character illustrated in Figure 41 with auxiliary equipment. These enumerated elements constitute a so-called control channel and means are provided in the AGCA system for placing each channel in the following conditions to perform the designated functions. These conditions and functions are:

(1) "Stand by"
(2) "Search"
(3) "Track"

(4) "Control"
(5) "Control with warning"
(6) "Wave off"

Means are provided for automatically sequencing the operation of a plurality of control channels, thus, assuming two control channels, i.e., Channel No. 1 and Channel No. 2, upon actuation the AGCA equipment in Channel No. 1 automatically goes into a "search" condition, while the equipment in Channel No. 2 remains in a "stand by" condition. Channel No. 1 thus awaits the incidence of an aircraft radar echo within the glidepath approach area. The incidence of such an echo causes the equipment of Channel No. 1 to automatically change from the search condition to the track condition and also institutes a ground air data link; the equipment in Channel No. 2 still remains in a "stand by" condition.

Means are provided herein for preventing the equipment in both Channels No. 1 and No. 2 from tracking the same aircraft, although the equipment in Channels No. 1 and No. 2 both may simultaneously "control" different aircraft. While tracking aircraft in the tracked condition, the particular channel has means for displaying the instantaneous range and speed of the aircraft being tracked by that channel and transmits signals of interrogation to the aircraft.

Confirmation of the ground air data transmission link by the incoming aircraft, causes the equipment in Channel No. 1 to change from the "track" to the "control" function. Upon switching to the control function, correction signals are sent to the aircraft; and, simultaneously, the equipment in Channel No. 2 is automatically switched from its "stand by" condition to its "search" condition, awaiting the incidence of echoes from a second aircraft within the approach zone. After incidence of such echo, the equipment in Channel No. 2 automatically goes into its track condition and later, after confirmation, goes into its control condition or function.

Thereafter, the equipment in Channel No. 2 may go into its "control with warning" condition or function should the aircraft which it is tracking, approach too closely the aircraft tracked by Channel No. 1; and, should the pilot of the approaching aircraft fail to heed the warning and slow up the speed of his aircraft to prevent the approaching aircraft from falling within a predetermined minimum spacing, then the equipment in Channel No. 2 automatically goes into a "wave off" condition or function, and transmits a maximum fly-up signal to the approaching aircraft. Other wave-off signals may be transmitted by either Channels No. 1 or No. 2, depending either on whether or not the particular aircraft being tracked responds to control signals, and, a normal wave-off signal is transmitted by Channels No. 1 and No. 2 successively as the aircraft which they correspondingly tracked reaches the touchdown point.

In general, the range tracking unit illustrated in Figure 13 performs the functions of aircraft acquisition and aircraft range tracking, and displays the instantaneous speed and range of the tracked aircraft. In addition, this unit produces a tracking on signal at the time the unit is switched from a search condition to its track condition. Also developed in the tracking unit is a so-called video on signal of the character illustrated in Figure 20 for "notifying" elements in the computer unit illustrated in Figures 18A, 18B, of the time at which video is present. Further, the tracking unit develops a "3-mile pick-off" signal when the tracked aircraft is within three miles of touchdown so as to render effective the operation of the excessive error wave-off circuitry in the computer unit, Figures 18A, 18B.

The operation of the range tracking channel is such that when it is in a "search" condition, radar echoes entering the tracking unit as standardized video are compared with a variable delay gate controlled by the one-tenth cycle per second saw tooth wave illustrated in Figure 11 and developed by the circuitry shown in Figure 10.

Coincidence of the delay of the range gate with the delay of video representing an aircraft causes the tracking unit to send the confirmation "tracking on" signal to the AGCA coder and the AGCA computer. Tracking of the incoming aircraft in range commences at this point and consists of constantly revising the range of the tracking gate so that it continues to encompass the approaching aircraft.

"Range voltage" proportionate to the delay of the tracking gate in relationship to the system trigger, is displayed and applied to other portions of the circuitry. The differentiation of "range voltage" with respect to time produces a "speed voltage" which is also displayed.

During the "search" condition, the range gate of the tracking unit has a width of approximately 2.2 microseconds. Confirmation of ground control by incoming aircraft applies a control "on" signal to the tracking unit to cause such unit to automatically switch from its track function to its control function and to simultaneously cause the tracking gate to be narrowed to approximately 2.2 microseconds.

During periods of "control" the range tracking unit passes range information to the AGCA computer (Figures 18A, 18B) and in addition, a video "on" signal which notifies the computer of the time at which video is present. During the "control" condition the area in which the tracking unit may track video is limited by an angle gate originating in the computer (Figures 18A, 18B).

The angle gate generator circuitry for this purpose, in Figures 18A, 18B, limits the region as indicated in Figure 20, within which the range tracking unit may respond to radar echoes to an area closely surrounding the tracked target. This angle gate circuitry is not operative during the "search" condition, but is rendered effective upon development of the tracking on signal, i.e., upon switching of the unit from the search condition to the track condition.

The AGCA system includes an overtake warning and wave-off unit, such unit being common to a plurality of channels of automatic flight control and providing two of the aforementioned safety features.

The tracking unit of each control channel, i.e., the aforementioned Channels Nos. 1 and 2, generates a range gate the time delay of which is directly proportionate to the instantaneous range of a tracked aircraft. This range gate is applied to the proper individual channel in the overtake warning and wave-off unit, which creates a so-called "safety gate" of manually variable width, immediately following the tracked aircraft.

The "safety gates" following each tracked aircraft are applied to a common bus, which is constantly monitored by a coincidence detector. Coincidence of the range gate of one tracked aircraft with that of another triggers a saw tooth generator circuitry whose output is measured for control purposes. The degree of "overtake," expressed as an output voltage for each channel, is measured by two relay control circuits. The existence of an "overtake" condition results in closing of a so-called "overtake" relay, which provides suitable warnings from a common bus. Greater degrees of "overtake" actuate the so-called "wave off" relay, to cause the transmission of wave off signals to the aircraft.

The AGCA system incorporates means shown in Figures 18A, 18B for generating an alternating voltage representing at the zero voltage crossover points an "ideal" glidepath and "ideal" course line, which are so adjusted to coincide with an actual physical ideal approach to a given air field. This glidepath and course line thus generated for the primary purpose of developing control signals for controlling the flight of an aircraft both in elevation and in azimuth, may be checked visually on the face of a cathode ray tube upon rearrangement of the circuitry used in accomplishing the primary function of developing control signals.

Also the AGCA system includes a so-called artificial aircraft unit as auxiliary equipment primarily useful for alignment purposes. In general, the artificial aircraft unit functions so that an electronically produced "artificial aircraft" may be manually shifted in a turn "elevation" and "azimuth" angular position, may be caused to pursue a rapid return in "range" and may be caused to "fly" either backward or forward. When used for alignment purposes, the artificial aircraft is inserted as a portion of a servo alignment loop in which a channel of automatically controlled flight tracks and controls the original aircraft. Control signals from the computer are integrated and used to control the "elevation" and "azimuth" positions of the artificial plane. Correction signals, computed by the ground equipment, may be compared with the visual position relationship of the artificial aircraft and the displayed ideal glidepath for alignment purposes.

Further, the AGCA system includes so-called clutter gating circuitry for developing gates adjustable in width and adjustable in range in the aircraft approach area. This clutter gating circuitry supplies a control signal to the computer illustrated in Figures 18A, 18B, when a tracked aircraft is within the limits of these adjustable gates, i.e., within a clutter area, such control signal serving to attenuate computed error signals within the gated areas.

*Brief description of range and angle tracking circuits with respect to Figures 24, 25, 26, 27 and 28*

In ascertaining the position of an aircraft with respect to a predetermined glidepath, certain concepts are embodied herein which are exemplified in connection with Figures 24 and 25. In this respect, Figure 24 illustrates a theoretical approach to the solution of this problem, while Figure 25 represents the circuitry as actually described in detail herein, the arrangement in Figure 25 being preferred particularly since it conveniently allows the development of an angle gate.

In Figure 24, range tracking of the aircraft is obtained using circuitry in the range tracking unit 1700, such unit 1700 being supplied with radar video, i.e., echoes and triggering pulses which are developed in timed relationship with respect to the transmission of pulsed energy to the aircraft; and such unit 1700 develops a voltage on lead 1701 representative of the range of the aircraft as well as a so-called stretched video signal on lead 1702, such stretched video signal being transmitted to the angle tracking circuit 1703 so as to render such unit 1703 sensitive or effective only during the period of such stretched video, i.e., the time during which radar echoes are being received. This stretched video developed on lead 1702 is compared, in time, with the antenna beam angle voltage supplied over lead 1705 to the angle tracking unit 1703; and as a result of the comparison of the stretched video signal with the angle voltage, a voltage is developed on lead 1707 representative of the actual position of the aircraft or plane. This voltage on lead 1707 representative of the actual position of the aircraft is compared with a second voltage developed in the reference generator 1708, such second voltage being applied to lead 1709 and being representative of the position of an aircraft flying "on course" along a predetermined glidepath or course line, as the case may be.

These two voltages developed on lead 1707 and 1709 are compared in a differential network including resistances 1710 and 1712, so as to develop a difference voltage on 1713, such difference voltage constituting the so-called error voltage and representing the deviation of the tracked aircraft from such predetermined glidepath or course line.

For this aforementioned purpose, the stretched video on lead 1702 serves to gate the angle tracking circuit 1703, so that angle voltage appears on lead 1707 only during the reception period of echoes.

Inasmuch as the radar equipment is located adjacent the aircraft landing field and not at touchdown, certain corrections are required in accordance with principles described in connection with Figure 21, such correction being supplied by the reference generator stage 1708, which may be considered to generate an ideal angle voltage in acocrdance with the particular value of range voltage appearing on lead 1701.

The error voltage developed on lead 1713 serves to modulate a transmitter for transmitting correction signals to the aircraft.

In the arrangement shown in Figure 25 which is more representative of the actual circuitry described herein, the range tracking unit 1700 supplied with video and system triggers develops on lead 1701 a voltage representative of the range of the aircraft and develops on lead 1702 a stretched video signal of the character illustrated in Figure 20. The range voltage is supplied to the reference generator 1720 which feeds a voltage to the so-called course computer unit 1722 to which is supplied also either azimuth or elevation antenna beam angle voltage, as the case may be at that particular instant.

The course computer 1722 serves to develop a predetermined glidepath or course line as the case may be, such glidepath or course line being determined by the cross-over points (indicated by "x" marks), of an alternating voltage of the character represented in Figure 26. A line passing through these "x" marks in Figure 26 establishes a so-called "on course" line. The alternating voltage of the character listed in Figure 26 appears on lead 1724 in both Figures 25 and 27 and is applied to an angle tracking unit 1726 for purposes of developing an error voltage on the output lead 1728, which is representative of the deviation of the aircraft from its "on course" position.

The angle tracking circuit 1726 is gated to receive incoming information only during the period of the stretched video gate transferred over lead 1702. The angle tracking unit described in detail herein and represented in block diagram form as unit 1726 in Figure 25 is illustrated in Figure 27.

The angle tracking circuit constitutes a servo loop in which a unidirectional feedback voltage developed on lead 1728 serves as an indication of the deviation of the tracked aircraft from the predetermined glidepath or course line. The error voltage developed on lead 1728 is used to modulate a transmitter for transmitting correction signals, so that the aircraft is caused to fly, or tends to fly, along such predetermined glidepath or course line.

In this respect, while the angle tracking unit as such constitutes a servo loop, such servo loop forms a part of a second servo loop, such second servo loop as illustrated in connection with either Figures 16 and 17 constitutes the angle tracking unit supplying information to the aircraft via the ground to air data link, the radar link between the aircraft and the radar installation, and the radar installation in turn, supplying information to the angle tracking unit.

Returning to the servo loop illustrated in Figure 27, the alternating voltage of the character illustrated in Figure 26 is sampled at the time of the stretched video on signal developed on lead 1702. In general, at coincidence of the stretched video on signal with a cross-over point of the alternating voltage illustrated in Figure 26, a zero error voltage is developed on lead 1728 indicating that the aircraft is flying on course; if, at the time of the stretched video on signal the aircraft is flying to the right of the on course line, a positive voltage is developed on lead 1728; and if, at the time of the stretched video signal the aircraft is flying to the left of the on course line, a negative voltage is developed on lead 1728.

The angle tracking unit illustrated in Figure 27 constitutes a closed electronic servo loop with an unique configuration of samplers and integrators, in which a step function 1730 is developed at the time of each cross-over point in Figure 26. This step function 1730 supplied through the limited amplifier 1732 to the sampler 1733 is compared with the stretched video supplied to such sampler 1733. The stretched video signal gates the sampler 1733 so as to cause admission of a positive charge to the first integrator stage 1734 during the time that the video occurs on the high side of the step and a negative charge during the time that video occurs on the low side of the step.

The first integrator stage 1734 integrates the areas under the positive and negative portions of the video envelope, and if any asymmetry exists, the output of the integrator stage 1734 is other than zero, i.e., either positive or negative, causing the second integrator stage 1734 to act in such a way as to center the step 1730 on the stretched video signal or envelope.

The use of double integration provided by stages 1734 and 1735 results in velocity memory in angle tracking, since the output of the first integrator 1735, 1734 is a voltage representing the angular position of the aircraft, and in the absence of video signals, this voltage does not change.

Another important feature of the angle error tracking circuitry illustrated in Figure 27 is that the vertical line of the step function 1730 is automatically centered with respect to the stretched video envelope thereby assuring weighing of all radar hits which constitute the stretched video envelope, it being remembered that the stretched video envelope is of the character illustrated in Figure 20. By thus giving weight to all radar hits, the effective center of the aircraft is established with respect to the predetermined glidepath or course line.

For purposes of assuring range tracking of aircraft appearing on or immediately adjacent the position of the tracked aircraft, the video supplied to the range tracking unit 1700 (Figure 25) is angle gated, i.e., such video is allowed to have its effect on the range tracking unit 1700 only during a relatively short interval when radar hits are being expected from an aircraft being tracked.

For that purpose an angle gate generator 1740 (Figure 25) is provided for developing angle gates substantially at the time the antenna beam crosses the aircraft.

In Figure 28 pulses corresponding to the periodic transmission of energy are represented at 1745 as "main bangs." The resulting video echoes of an aircraft flying on or adjacent to the on course line are represented at 1746. A reference delay voltage 1747 is developed in the range tracking unit 1700, by means described in detail elsewhere herein, for tracking such video signal 1746, i.e., for producing range tracking.

As a result of coincidence between the video echo 1746 and delay voltage 1747, the bipolar early and late gates 1748 and 1749 respectively are developed in the range tracking unit 1700. The positive portions of the gates 1748, 1749 are effectively added to produce the range gate 1750.

The range gate 1750 is used for producing different control effects in the system as described herein. One safety feature of the present system resides in the fact that it will not supply correction signals to the aircraft being tracked, unless the video signal 1746 falls within the range gate 1750 and angle gate simultaneously.

*Ground rate and air rate systems shown in Figures 16 and 17*

Two simplified block diagrams of the AGCA system are presented in Figures 16 and 17. Figure 16 shows a system using "ground rate" while Figure 17 shows a system using "air rate." These two systems are provided by suitable switching to adapt the system for controlling aircraft having different autopilots.

Precision radar equipment 700 shown in Figure 1 scanning the approach area provides the AGCA equipment with the azimuth and elevation angular scanning data and video targets within the limits of the region scanned. The radar equipment also supplies a system trigger to the AGCA equipment.

Range tracking is accomplished by the AGCA tracking unit 701, shown in Figures 12 and 13, which constantly revises the delay of a range rate in such a manner that it encompasses the video envelope of a tracked aircraft. Tracking results in the generation of a range voltage ($\varphi$) directly proportional to the delay, or range of the radar target echo with relation to the touchdown point.

A second output of the range tracking unit 701 is stretched video shown in Figure 20, a gate of fixed amplitude, enduring for the time required for the radar scan to cross the tracked target, plus a fixed period of 500 microseconds. The extension of stretched video throughout the AGCA system is known as the "video on" signal.

With respect to the reference computer 702, details of which are shown in Figure 18A, assuming that for the small angles scanned in the AGCA approach area, the value of the sine of the angle is approximately equal to the angle expressed in radians, it may be shown that, assuming a touchdown angular position voltage as a reference of zero volts, the correct position angle voltage for any range is found by the general equation $E_r = K(1 - 1/n)$, where K is an arbitrary constant, and "n" is a factor expressing the range of the aircraft from touchdown divided by the range from the equipment to touchdown. The function, therefore, of the reference computer, is the translation of the range voltage ($\varphi$) to a reference voltage, $f(R)$, which, when added to a suitably shifted azimuth or elevation angle voltage, as the case may be, will result in a voltage of zero when the antenna is at the angle equal to the corresponding azimuth or elevation position of an aircraft "on course" for any given range (zero to ten miles). The input to the reference computer, therefore, is the range voltage ($\varphi$), generated in the tracking unit. The output of the reference computer is a general function of this input, following the equation $f(R) = K(1 - 1/n)$.

The function of the course computer 703, details of which are shown in Figure 18A, is the inversion of elevation angle voltage, and the addition of level-shifted elevation and azimuth angle voltages to the reference voltage. The output of the course computer is a pair of composite angle and reference signals whose value at the instant that the "video on" signal occurs denotes the error of the tracked aircraft from course or glidepath, i.e., error in azimuth or elevation, as the case may be. One of this pair of signals, i.e., the azimuth signal, appears on lead 704 while the other signal, i.e., the elevation signal appears on lead 705. These signals on leads 704, 705 are ninety degrees out of phase and vary cyclically at approximately 2 cycles per second.

The azimuth and elevation angle tracking circuits, 707, 708, respectively, each incorporates a substantially identical closed servo loop which is shown in detail in Figure 18A and which is arranged in such a way as to measure the amount by which the input signal deviates from zero at the time of the "video on" signal supplied thereto over leads 709, 710 respectively. As explained more fully elsewhere, this constitutes a measure of the angular deviation of the aircraft from a predetermined course or glidepath. In the azimuth tracking circuit 707 the position error determined by the loop is compared with the composite output of the course computer at the time for the "video on" signal. If the values are equal the "video on" signal is bi-sected by a step voltage and no loop error exists. Hence the course error of the aircraft has been correctly found. If the step voltage does not bisect the "video on" signal a loop error is sensed which, acting upon the integrators, causes the error voltage output to change in such a manner as to make the step bisect the "video on" signal and make the output correctly describe the error of the plane from course. The output of the tracking circuits 707, 708, appears on leads 712, 713 respectively as continuous voltages representing the position errors of the tracked aircraft in azimuth and elevation respectively.

Both azimuth and elevation control signals appearing on leads 712, 713 are modulated by "course softening" stage 715 (details of which are shown in Figure 18B) in which control signals are modified by the range voltage in such a manner as to decrease the sensitivity of the system to flight errors as the controlled aircraft approaches touchdown. "Course softened" elevation control signals in both Figures 16 and 17 are applied directly to the ground-air linkage 717, where they are transmitted to the aircraft 722 and applied as elevation correction signals to the autopilot approach coupler 723 in such aircraft. The transmitted and reflected radar signals 720, 721 respectively between the radar installation 700 and aircraft 722 complete a servo loop.

Azimuth error signals in Figure 16, originating in the azimuth angle tracking circuit 707 and appearing on lead 712, are limited, in limiter stage 725 (Figure 18A), in value prior to application to the "course softening" circuitry 715. Azimuth error voltages are also differentiated in "rate" stage 726, producing a rate-of-error signal with regard to time for application to the "course softening" circuitry 715. The resulting control signal, "course softened" as a function at range, consists of the addition of azimuth error signals and azimuth rate-of-error signals, multiplied by range. The composite information is transmitted by the ground-air link 717 to the aircraft's autopilot approach coupler 723.

When the system is set for "ground computed rate," as shown in Figure 17, circuitry of the computer unit shown in Figure 18B, supplies both azimuth error signals and azimuth rate-of-error signals to the aircraft. For use of the system in "ground rate" configuration, certain modifications or adjustments are necessary in the airborne equipment so that rate-of-error signals are not added by the autopilot approach coupler to those rate-of-error signals already transmitted from the ground equipment.

The output of the "course softening" circuitry 715, in both Figures 16 and 17, consisting of azimuth and elevation control voltages is applied to the ground-air data link. The ground equipment of the data link consists of the AGCA coder unit, the AGCA transmitter-mixer unit, and the BC-640A transmitter, all shown in Figure 7. The function of the coder unit is the translation of the D.-C. control voltages to a modulation of a suitable type for transmission on the carrier of the BC-640A transmitter. Range voltage, applied as a direct function from the tracking unit output, is also applied to the coder unit for transmission of range-to-touchdown information to the controlled aircraft. The airborne equipment of the ground-air link consists of a modified receiver for reception of VHF transmission of the BC-640A transmitter, and the AGCA decoder unit which evaluates AGCA, automatic ground controlled approach information transmitted over the ground-air link.

It is requisite that aircraft in the AGCA system be equipped with an autopilot and a suitable approach coupler for the translation of the decoder output to suitable autopilot control signals, and for the further translation of autopilot signals to changes of aircraft controls for the achievement of new flight situations. The controlled aircraft therefore represents a beginning and an end point for the AGCA loop of control.

The basic principles of the AGCA system when using "air-computed rate" shown in Figure 17, differ from those of the system when using "ground rate," shown in Figure 16, in that the airborne autopilot approach coupler supplies rate-of-error signals to the autopilot by the differentiation of pure error signals transmitted by the ground equipment.

*Description of video standardizer or video shaper shown in Figures 7 and 8*

In general, the video standardizer or shaper included on the chassis of the AGCA synchronizer accepts radar video from the radar trailer and produces pulses of equal width and amplitude for tracking purposes. The video standardizer accomplishes video shaping by measuring incoming radar echoes and utilizing all signals above a predetermined level to produce standardized pulses.

The input to the video shaper is either normal video produced by the apparatus illustrated in Figure 1 and appearing on lead 22 or, in the alternative, may be video developed in the so-called artificial aircraft unit, depending upon the position of a switch in the coder unit.

As seen in Figure 8, the circuitry of the video standardizer includes amplifiers 138, 139 and blocking oscillator 140A, 140B. The video selected by switch S-6003 is capacity coupled to the control grid of amplifier tube 138. The cathode of tube 138 is returned to ground through resistance 141, while the control grid is connected to an adjustable tap on the potentiometer resistance 142, having one of its terminals grounded and the other one of its terminals connected through condenser 143 to the movable switch element of switch S-6003. Such switch element is connected to the ungrounded terminal of the resistance 144. Thus the resistance 142 serves to control the amplitude of the video applied to the tube 138.

In general, the tubes 138, 139 are conventional video amplifiers with the anode of tube 138 coupled by means of condenser 145 to the control grid of tube 139. The voltage thus developed on the anode of tube 139 is applied through coupling condenser 146 to the control grid of the trigger tube 140A. The control grid of tube 140A is connected to the adjustable tap on the potentiometer resistance 148, such resistance 148 being connected in a voltage dividing circuit which includes the voltage source 150 and serially connected resistances 151, 148 and 152. More specifically, the control grid of tube 140A is connected to the adjustable tap on resistance 148 through the serially connected resistances 154, 155. A rectifier 156 is connected in shunt with resistance 155 and the tap on resistance 148 is bypassed to ground by condenser 158.

The anode of tube 140A is connected to receive the az.-el. intensifying gate appearing on the leads 90, 88 and having the form illustrated in Figure 4, such connection being made through the serially connected resistance 159 and winding 160 of the blocking oscillator transformer 161. The junction point of resistance 159 and winding 160 is bypassed to ground by means of condenser 162. The cathode of tube 140A is grounded. By these connections it is observed that the tube 140A is rendered effective only during the periods of the azimuth or elevation scanning periods, i.e., only during those periods in which radar video is expected.

The cathode of tube 140B is returned to ground through resistance 163 which forms load resistance across which the standardized video output appears on lead 36. The control grid of tube 140B is connected through the winding 164 to the adjustable tap on the potentiometer resistance 166, such resistance 166 being in a voltage dividing circuit which includes the serially connected voltage source 167, resistance 168, resistance 166 and resistance 169. Bypass condenser 171 is connected between the cathode of tube 140B and the tap on resistance 166. The anode of tube 140B is connected through the serially connected winding 170 and resistance 172 to the positive terminal of voltage source 173.

While the gating voltage, i.e., the intensity gate, applied periodically to the anode of tube 140A, serves to assure operation of the circuit only during the time which radar video is being expected, additional means are provided to prevent the transfer of video during those portions of the azimuth and elevation scanning periods corresponding to the regions in which pattern clipping is illustrated in Figure 6.

Such additional means includes a connection from the lead 174 to the junction point of resistances 154, 155 to which the az.-el. negative-going limiter gate 40B is applied through the coupling condenser 175. This gating voltage 40B is of sufficient intensity to render the blocking oscillator stage 140A, 140B inoperative for the duration of such gating voltage 40B.

Crystal rectifier 176 connected in shunt with the grid return resistance 177 prevents overshoots in the grid circuit of tube 139, which otherwise may be produced in response to integration of the unblanking signal.

It is thus observed that, in the presence of the unblanking gate applied to the anode of tube 140A, the tap on resistance 148 provides threshold adjustment of the level necessary to fire the blocking oscillator stage 140A, 140B. All pulses above the level determined by resistance 148, and occurring during the presence of the az.-el. unblanking gate, thus cause the blocking oscillator stage to produce pulses of standardized amplitude and width useful for tracking purposes.

*Description of one-tenth cycle per second sawtooth generator illustrated in Figures 7, 9, 10 and 11*

This generator, a searching sweep generator, mounted on the chassis of the AGCA synchronizer unit generates a slow sweep voltage for application to the acquisition circuits of the tracking unit during the "search" function of the system. In general, this search sweep voltage is used to control the delay of the range gate, which is monitored by coincidence circuits of the different tracking units for the presence of aircraft video echoes. The characteristics of this search sweep voltage are illustrated in Figure 11.

To produce the voltage variation shown in Figure 11, the condensers 190 and 191, in Figure 9, are alternatively arranged to discharge through a discharge path which includes the tube 179 and resistance 199.

The circuitry of the searching amplifier generator illustrated in Figure 9 includes a voltage regulator tube 178 for stabilizing the screen grid voltage of tube 179, a cathode follower tube 180, an amplifier tube 181, clamp tubes 182 and 183 and a series of tubes 185, 186 connected in an Eccles-Jordan "flip-flop" circuit.

The operation of the sawtooth generator is initiated by the opening of the normally closed contacts of the thermal time delay relay 187, one of such contacts being connected to the lead 188 of positive potential and the other one of such contacts being connected (1) to the anode of tube 179, (2) to the ungrounded terminal of condenser 189, and control grid of tube 180, and (3) to fixed contacts 200, 201 of the relay 192. Thus, in the initial "cold" condition of relay 187 a positive potential of 150 volts on lead 188 is applied to the anode of tube 179; and, such voltage charges capacitor 189 and either condenser 190 or 191 depending upon whether the relay 192 is energized or deenergized. As shown, relay 192 is deenergized and in such case condenser 191 is charged through contact 201. After the contacts of relay 187 open, the precharged condenser discharges through the tube 179 at a relatively slow rate. When the voltage at the anode of tube 179, and therefore at the cathode of the cathode follower tube 180 falls to a critical value determined by the setting of the tap on the so-called minimum adjust search speed resistance 193, tube 181 is cut off thereby deenergizing the relay 194.

It is observed that the cathode of tube 180 constitutes the output terminal 30 of the generator and that such cathode is connected to the negative voltage source 202 through the serially connected resistances 204, 193 and 205. The anode of tube 180 is connected to the positive ungrounded terminal of voltage source 206. The adjustable tap on resistance 193 is connected to the control grid of tube 181 through resistance 207. The cathode of tube 181 is grounded through the manually operable switch 208. The anode of tube 181 is serially connected with the winding of relay 194 to the positive lead 188.

It is observed that in the energized condition of relay 194, the condenser 195 is connected through resistance 209 to the negative lead 210 so as to be precharged at a negative potential. Upon deenergization of relay 194, as described previously, the negatively charged condenser 195 is connected to the cathodes of the clamp tubes 182, 183 which serve to limit the negative voltage applied respectively to the anodes of tubes 185 and 186. The discharge of condenser 195 thus results in a large negative-going pulse applied to the Eccles-Jordon trigger circuitry which includes the tubes 185, 186, a so-called "flip-flop" circuit. Such large negative-going pulse causes one control grid to rise suddenly above a cut off value, initiating an amplifying function and causing the anode of that section to draw heavy current while the anode of the other section draws substantially no current. It is observed that the cathodes of the tubes 185, 186 are grounded and that the control grids of tubes 185, 186 are connected to the negative lead 210 through corresponding resistances 211, 212. Further, the control grid of tube 185 is connected to the anode of tube 186 through resistance 214; and likewise the control grid of tube 186 is connected to the anode of tube 185 through resistance 215. The anodes of tubes 183 and 186 are connected through resistance 216 to the positive terminal of source 206. The anode of tube 185 is serially connected with the winding of relay 192 to the positive terminal of voltage source 206.

Assuming tube 186 is undergoing the aforementioned cut off function of the trigger cycle, relay winding 192 is deenergized as shown to apply the accumulated charge of condenser 191 to the anode of tube 179. On alternate cycles of relay 192 condensers 190 and 191 are alternately charged during their "off duty" period.

In the "off duty" period of condenser 190, as shown in Figure 9, the condenser 190 has its ungrounded terminal connected through relay contact 218 to the adjustable tap on the so-called maximum adjust search speed potentiometer resistance 197, such resistance 197 being in a voltage dividing circuit which includes the serially connected voltage source 206, resistance 220, resistance 197, and resistance 221. It is observed that in the "off duty" period of condenser 191 it is likewise charged with positive voltage supplied from the tap on resistance 197 but is charged in such case through the relay contact 223.

It is further observed that the condenser 189 supplies anode voltage to tube 179 during the time of relay switching, thus eliminating undesirable transients from having their effect on the az.-el. indicator display.

In order to stabilize the operation of tube 179, its screen grid is connected to the ungrounded terminal of the voltage regulator tube 178, such terminal being connected through resistance 224 to the source 206.

In order to control the rate at which the condensers 190, 191 discharge, i.e., to control the slope of the sawtooth waves illustrated in Figure 11, the control grid of tube 179 is connected to an adjustable tap on the resistance 196, such resistance being connected in a voltage divided circuit which includes the serially connected voltage source 202, resistance 226 and resistance 196.

The switch 208 provides a recycling function, i.e., by opening the same the relay 194 is deenergized to cause the previously negatively charged condenser 195 to be applied to the flip-flop circuit as described above, to initiate a new cycle.

It is noted, as alluded to above, that the following controls have the following functions, the setting of the tap on resistance 197 determines the maximum voltage at which the condensers 190, 191 are charged, and hence determines peak voltage of the sawtooth wave; the setting of the tap on resistance 196 determines the slope of the sawtooth waves; while the setting of the tap on resistance 193 determines the minimum value of the sawtooth wave.

*Description of range tracking unit illustrated in Figures 7, 12 and 13*

The range tracking unit illustrated in block diagram form and in the schematic form, respectively, in Figures 12 and 13, incorporates a servo loop functioning to cause tracking of an aircraft in range, such servo loop serving to develop certain control voltages for purposes of angle tracking, computation as well as for producing other control effects.

The input to the range unit includes:

(1) Video over lead 72;

(2) System triggers over lead 12;

(3) The sawtooth voltage wave illustrated in Figure 11 over lead 30, such sawtooth wave, however, being effective only during the "search" function of the equipment;

(4) An angle gating voltage supplied to the tracking unit over lead 56 from the computer unit, such angle gating voltage serving in general to limit the time during which the range tracking unit responds to incoming video. This angle gating voltage may be considered as being the result of range and angle tracking and not a means for range or angle tracking and is illustrated in Figure 20;

(5) A "control-on" signal developed in the coder unit and transferred over lead 74 is for control purposes. This control-on signal and other input voltages enumerated below as input signals are in the form of control signals for the range tracking unit described under this heading;

Briefly, the control-on signal, transferred over lead 74, is the result of "confirmation," i.e., an acknowledgment by an incoming aircraft that is conditioned for reception of control signals which are thereafter transmitted from the ground to the aircraft for automatically controlling the flight of the same;

(6) Identification voltages transferred over lead 38, such identification voltage when applied by manually operating a switch on the control panel, serves to override the angle gates applied to lead 56, i.e., when identification voltage is present on the lead 38 the index marks developed in the range tracking unit is not limited to the short duration of the angle gate voltages;

(7) Warning and "wave off" interlocking voltages are transferred over lead 78 from the coder unit. For purposes of describing the range tracking unit, continuous 28 volts may be assumed to be present on lead 78;

(8) Index mark interlocking voltages are transferred from the coder unit over lead 76;

(9) The rejection bus 40 is connected between identical elements of different range tracking units in a multiplane landing system and the signals on this bus 40 may be considered either incoming signals or outgoing signals depending upon the relative positions of aircraft being tracked by the two interconnected range tracking units;

(10) The lead 64, during "cursor" operation serves to convey cursor signals from the computer unit to the range tracking unit.

The output signals from the range tracking unit are:

(1) Range voltage appears on lead 82 and the magnitude of such voltage serves as a measure of the range of the tracked aircraft;

(2) A "stretched video" signal is developed on lead 84 and serves to control other related units during that portion of the antenna beam scanning period when radar "hits" are being made on the incoming aircraft;

(3) A range voltage is also developed on lead 80 for control purposes only and is applied to the coder, such range voltage varying as the range voltage on lead 82, but being of smaller magnitude. This range voltage on lead 80 is used for transmitting to the incoming aircraft information as to its range from touchdown;

(4) Index marks or cursor pulses, as the case may be, appear on the output lead 42, such index marks being applied to an intensity control electrode of a cathode ray tube and constituting a pair of time spaced marks which bracket the image of the aircraft on the cathode ray tube screen for purposes of identification;

(5) A so-called "three-mile pick off" signal appears on lead 58 only when the tracked aircraft is within three miles of touchdown, such pick off signal being used for control purposes in the excess error wave off portion of the computer unit. This signal as well as the other output signals enumerated below are in the form of control signals;

(6) A so-called range gate appears on lead 44 and is applied to the overtake warning and wave off unit as well as to "gating central";

(7) A wave off signal is developed on lead 60;

(8) A "tracking on" signal is developed on lead 66 and applied to the computer unit and coder unit for purposes of conveying information to those units to the effect that the range tracking unit is changed from its "search" function to its "track" function;

(9) An alarm signal is developed on lead 62 to convey information as to loss of video.

In general, the range tracking unit includes a servo loop. The servo loop includes the multi-vibrator stage V2; the early-late gate generator V3 in the form of a blocking oscillator stage; the early and late gate detector stages V5 and V6, the differential integrator stage V7; the cathode follower clamp stage V8; the range integrator stage V9, V10; and the lead 35 extending from the stage V10 to the multi-vibrator stage V2 completes the loop. The voltage on such lead 35 is termed the "range voltage" and is a measure of the range of the traced aircraft, when such aircraft is being tracked. The voltage on this lead 35 may be measured on the volt meter 226, i.e., the range meter 227, when the relay 243 is energized.

In order to obtain an indication of the speed of the tracked aircraft on the speed volt meter 231, such volt meter 231 is coupled to the lead 35 through a differentiating network and D.-C. amplifier which includes the tube V11. For that purpose, in the automatic position of switch 228, the lead 35 is coupled to the control grid of tube V–11A through the stationary contact 233 and differentiating network, such differentiating network including the condenser 234 and resistance 235.

The cathodes of tubes V–11A and V–11B are interconnected by means of potentiometer resistance 236 which has its adjustable tap returned to ground through resistance 237. The anodes of tubes V–11A and V–11B are interconnected by means of condenser 239 and are supplied with space current from a 300-volt source through resistances 240 and 241, respectively. The control grid of tube V–11B is grounded. The voltage developed between the anodes of tubes V–11A and V–11B, i.e., across condenser 239, is applied to opposite terminals of the speed volt meter 231. It is noted that the relay 243 is energized in the track function of the unit and is deenergized in the search function of the unit. In the track function the speed is indicated by meter 231; but such meter is disconnected in the search function to avoid damage to the meter inasmuch as searching occurs at a rate comparable to 3,000 miles per hour. It is observed that for this purpose one terminal of the meter 231 is serially connected with the adjustable resistance 245 to the anode of tube V–11A; while the other terminal of meter 231 is connectible through the relay switch 243A to the anode of tube V–11B.

The abovementioned servo loop includes two integrator circuits which include respectively the condenser 246 and condenser 247, condenser 247 being associated with the range integrator stage V9, V10. The voltage developed on condenser 246 is a measure of the velocity of the tracked aircraft and voltage derived from such condenser 246 is integrated in the stage V9, V10 and applied as aircraft range voltage to the aforementioned lead 35.

The manner in which the so-called speed voltage appearing on condenser 246 is developed, is now described in relationship to stages V-1A, V2, V3, V5, V6 and V7.

The system trigger, in the form of a positive pulse, is applied through lead 12 to the control grid of the buffer amplifier tube V-1A, and after amplification therein is applied as a negative pulse to the control grid of tube V-2B. The tubes V-2B and V-2A comprise a part of the multivibrator stage V2. It is observed that the tube V-2B, in its quiescent state, is highly conducting since a positive voltage appears at such time on its control grid. The cathodes of tubes V-2B and V-2A are interconnected so that in such quiescent state the cathode of tube V-2A is at a relatively high positive potential. The so-called range voltage appearing on lead 35 is applied through resistance 249 and through a voltage dividing network 250 to the control grid of tube V-2A.

The multivibrator stage V-2 serves to develop a negative-going gating voltage 251 on the cathode of tube V-2A, the duration of which varies in accordance with the magnitude of the voltage on lead 35. Such gating voltage is started upon appearance of the system trigger, in inverted form, to the control grid of tube V-2B. The multivibrator stage V2 is thus termed a timing modulator since it serves to develop a negative-going gate on the cathode of tube V-2B with a duration representative of the magnitude of the voltage appearing on the lead 35.

Such negative-going gating voltage 251 is differentiated by the differentiating network comprising condenser 252 and resistance 253, which are in the grid circuit of the blocking oscillator stage V3. A positive pulse corresponding to the trailing edge of the negative-going gating voltage 251 is thus applied to the control grid of the trigger tube V-3A. Such positive pulse is, of course, delayed with respect to the system trigger in an amount corresponding to the duration of the negative-going gating voltage 251 developed in stage V2. It is noted that the potentiometer resistance 254 is adjusted so that with zero voltage applied to lead 35, a delay is interposed which coersponds to the aircraft touchdown position, while resistances 256, 257, 258 allow adjustment of the scale of the delay with respect to range voltage.

The blocking oscillator stage V3 has two separate output circuits, one of which includes the transformer winding 259 for developing a so-called early gating voltage or gate 260. A late gate 261 is developed on the anode of tube V-3B. The first or "early" gate consists of a positive-going wave form 260 followed by a negative-going wave form and is applied to the suppressor grid of the early detector tube V5. The second or late gate 261 consists of a negative-going wave followed by positive-going wave form and is applied to the suppressor grid of the late detector tube V6. These positive portions of the pulses 260, 261 produced by oscillator V3 thus appear alternately in the suppressor grids of the early-late gate detectors V5 and V6 causing them to be placed in a condition that they may conduct when positive gated video signals are coincidently applied from lead 262 to the respective control grids of tubes V5 and V6. In other words, tubes V5 and V6 are essentially coincident tubes arranged to conduct only when there is a positive signal applied both to their control grids and suppressor grids.

The manner in which the video appearing on lead 262 is gated is described in detail hereinafter but, in general, such video, when it appears, preferably has a uniform height and a uniform width, so that in effect such video may be uniformly compared with the positive portions of the wave forms 260 and 261.

The signal passed by the early-late detectors V5, V6 is applied to the grids of differential integrator circuits consisting of two triode sections V-7A and V-7B of stage V7.

It is observed that video signals corresponding with the positive-going portion of the early gate 260 are passed by tube V5. Video signals corresponding with the positive-going portion of the late gate 261 are passed by tube V6. The signal appearing on the anode of tube V5 is applied through the pulse transformer 264 to the control grid of integrator tube V-7A so as to charge condenser 246. Video signals corresponding with the positive portion of the late gate 261 is passed by tube V6 and applied by pulse transformer 265 to the control grid of the integrator tube V-7B, lowering the voltage on condenser 246. The combined effect, therefore, of the early-late gate detector circuitry is to charge condenser 246 when radar video corresponds with the early gate (indicating that the aircraft is moving forward at a rate greater than that of the range gate) and to discharge condenser 246 at the time of coincidence of video signal with the late gate (indicating that the gate is going forward at a greater rate than the aircraft). The combined output of tube V-7A and V-7B thus appearing across condenser 246 may be interpreted as a "speed" voltage for the tracked aircraft. It is noted that the range gate mentioned in the previous sentence is defined by the positive portions of the wave forms 260, 261, such positive portions being displaced, of course, along the time axis. This range gate is formed using the mixer stage V4.

The mixer stage V4 includes the two cathode follower tubes V-4A and V-4B, each of which have their cathodes returned to ground through the common load resistance 266. The control grid of tube V-4A is coupled through the parallel connected resistance 268 and rectifier 269, and serially connected condenser 267 to one terminal of the winding 259 to thereby receive the early gate voltages. The control grid of tube V-4A is returned to ground through condenser 270.

The control grid of tube V-4B is connected through the stationary relay contact 271 and condenser 272 to the anode of tube V-3B so as to receive the late gate when the relay 273 is deenergized as shown in Figure 13. It is noted that the relay 273 serves generally to narrow the range gate and to increase the time constant of the servo loop in the "control" function of the equipment, i.e., after the incoming aircraft has confirmed or acknowledged that it is in condition for reception of transmitted control signals; or, more specifically, while angle tracking is being accomplished. For that purpose the relay 273 is energized by the "control on" signal applied to lead 74. With relay 273 energized the control grid of V-4B is connected to a −150-volt source and is no longer receptive to the late gate; at the same time the resistance 276 is no longer short circuited by the relay switch 277 but such resistance 276 is then serially connected with the condenser 246. Thus with relay 273 energized the range gate appearing on lead 262 has a time duration commensurate only with the time duration of the early gate and is substantially independent of the time duration of the late gate. As indicated in Figure 13, the range gate developed across resistance 266 has a time duration of approximately four microseconds in both the search and track functions of the equipment; but in the control function the time duration is decreased to a value of approximately 2.2 microseconds. The manner in which the range gate thus developed on lead 275 is utilized is described in detail hereinafter.

As noted previously, a voltage representative of the speed of the aircraft is developed across condenser 246. The voltage appearing across condenser 246 produces a proportional voltage on the cathode of the cathode follower stage V8.

Stage V8 comprises tubes V-8A and V-8B, which have their cathodes interconnected and, in turn, connected to a —150-volt source through serially connected resistances 279 and 280, the junction point of which is bypassed to ground by means of condenser 281.

The voltage appearing on the cathodes of tubes V–8A, V–8B is applied to the control grid of the range integrator tube V9 through the normally closed relay switch 282 of relay 283. It is noted that the relay 283 is shown in its deenergized condition which corresponds to the condition wherein the circuit is adjusted for automatic tracking. Relay 283 is energized only during the time the apparatus is conditioned for so-called cursor operation wherein the switch 284 is set to its "cursor" position, thus remains deenergized in the normal operation of the tracking loop. It is observed that the control grid of tube V9 is grounded by the normally closed relay switch 285 of relay 286. Relay 286 when deenergized as shown is in its search position; but such relay 286 is energized during the track function of the unit. Thus during the search function the control grid of tube V9 is grounded; but during the track function the voltage developed on the cathodes of tubes V–8A, V–8B is applied to the control grid of tube V9.

Thus, in automatic tracking, the speed voltage appearing on the cathodes of tubes V–8A, V–8B is applied to the control grid of the second integrator stage V9, and the integrator output appears on the cathode of cathode follower stage V–10A. For that purpose, the anode of tube V9 is conductively connected to the control grid of tube V–10A through the normally open relay switch 289 of relay 286. The cathode of tube V–10A is returned to the negative terminal of a 150-volt source through a serial circuit which includes potentiometer resistance 290 and fixed resistance 291. The resistance 290 is shunted by the neon discharge tube 292. The integrating condenser 247 has one of its terminals connected to the cathode of tube V–10A and the other one of its terminals connected through switch 282 to the control grid of tube V9. Control grid of cathode follower tube V–10B is connected to the adjustable tap on resistance 290 so as to develop a corresponding voltage on its cathode. The cathode of the V–10B is returned to the —150-volt source through serially connected resistance 293 and 294.

A regenerative feed back path is provided between the output of tube V–10B and the input of tube V–9, such feed back path comprising the serially connected thyrite resistance 297, the fixed resistance 298 and potentiometer resistance 299, which has its tap connected to the cathode of tube V9. The purpose of the thyrite resistance 297 is to introduce non-linearity in the feed back circuit to compensate for curvature in the characteristic curves of the amplifier tube V9. The voltage thus developed on the cathode of tube V10 is the range voltage and is applied to the range voltage lead 35 in the automatic position of the manually operable switch 228. This voltage on the cathode of tube V10 consists of integrated "speed" voltage and represents the range of the tracked aircraft in terms of nautical miles on a linear scale, the scale being 15 volts per mile.

As indicated above, the voltage developed on lead 35 is applied to the control grid of tube V–2A to complete the loop with the gate width of a multivibrator output 251 being controlled by the range voltage applied through the combination of resistances 250, 256 and 258. The pulse width of the output of multivibrator V2, controlled as a direct function of the range voltage, causes, in turn, revision of the range voltage in an amount depending upon the relationship of the incoming video with the pulse derived from the trailing edge of such gating voltage 251. Aircraft approaching the radar installation cause video pulses to coincide with the positive portions of the early gates 260, charging condenser 246, causing the "speed" voltage at the cathode of tube V8 to rise, and the range voltage from tube V9 to fall. Decreasing range voltage decreases the gate width of the output of the multivibrator V2.

*Coast speed circuitry in Figure 13*

As mentioned above, the range voltage on the cathode of tube V–10 is applied to a voltage dividing circuit which includes the serially connected resistances 293A, 294. The junction point of the resistances 293A, 294 is connected through resistance 300 to the control grid of tube V–1B, the so-called 3 mile pick off tube. Tube V–1B is arranged to conduct only when the tracked aircraft is beyond 3 miles of touchdown. For that reason the tube is sensitized with range voltage as indicated above. The cathode of tube V–1B is grounded and has its anode connected to a +300 volt source through resistance 301. The anode of tube V–1B is likewise connected to a voltage dividing circuit which includes the serially connected resistance 303, potentiometer resistance 304, fixed resistance 305 and —150 volt source 306. The tap on resistance 304 is connected through the minimum coast switch 307 to the control grid of tube V–8B in the on position of such switch. In the off position of such switch 307, the control grid of tube V–8B is connected to the negative terminal of voltage source 310.

The tube V–1B is adjusted so that it becomes cut off when the range voltage corresponds to distance less than 3 miles; and when such tube V–1B cuts off, the voltage developed on the anode of tube V–1B is not only transferred in controllable amounts to the control grid of tube V–8B but is also transferred to the lead 58, which constitutes the so-called 3 mile pick off lead. The tap on resistance 304 may be adjusted to provide different minimum coasting speeds. Generally the voltage thus applied to lead 58 serves to render operative the excess error wave off circuitry in the computer unit only when the aircraft is within 3 miles of touchdown.

*Description of circuitry for developing video "on" signal in Figure 13 from range and angle gated video*

The "video on" signal is developed for control purposes. The circuitry produces for this purpose a square pulse of a high amplitude and sharp definition, the width of the pulse being equal to a time period of the entire video train within the range and angle gates, plus a 500 microsecond delay for the last pulse. Because of this additional delay of 500 microseconds, the "video on" signal is sometimes referred to as "stretched" video and is shown in Figure 20.

The range and angle gated video appearing on the anode of tube V–15B is applied through condenser 383 to the cathode of the video stretch tube V–18A. The cathode of tube V–18A is connected to the adjustable tap on resistance 384 through the resistance 385, such resistance 384 serving as a voltage dividing element since its ungrounded terminal is connected to the —150 volt source. Condenser 386 has one of its terminals grounded and the other one of its terminals connected to the tap on resistance 384, such tap being likewise connected through resistance 387 to the anode of tube V–18A. The control grid and anode of tube V–18A are interconnected and connected through resistance 388 to the control grid of tube V–18B. The cathode of tube V–18B is connected through resistance 389 to the —150 volt source. The anode of tube V–18B is connected to the —150 volt source through resistance 400. Condenser 401 is connected between the anode of tube V–18A and ground. The control grid of cathode follower tube V–19A is connected to the anode of tube V–18B. The cathode of tube V–19A is connected through resistance 403 and resistance 389 to the —150 volt source. The "video on" signal thus developed on the cathode of tube V–19A is applied to the video on lead 84 through the track cursor switch 284, such switch 284 being manually operated and maintained in the "track" position in normal operation of the unit.

In summary, the output of blocking oscillator tube V–15B is taken from the anode of that tube and applied to the cathode of video stretch tube V–18A. The condenser 386 is charged by such video signal but the charge may leak from such condenser 386 at a rate determined by the magnitudes of resistances 387 and 384, the resistance 384 being termed the stretch control resistance and the tap on the same is adjusted so that tube V–18B is cut off for a period equal to a pulse repetition interval of 500 microseconds, such pulse repetition interval being that of the radar system. The effect of this circuitry therefore is the production of a video on signal at the cathode of tube V–19A having a duration equal to a time period of the entire video train within the range and angle gates plus a 500 microsecond delay for the last pulse. This video on signal is divided into two branches of circuitry at the cathode of tube V–19A, i.e., the video on signal storage circuitry, which includes the tube V–23A, and the acquisition control circuitry, which includes the tube V–19B. Also the video signal is applied to the video on lead 84 for performing certain control functions in the computer unit.

*Description of automatic transition from "search" function to "track" function with reference to Figures 12 and 13, i.e., aircraft acquisition control*

During the search function the sawtooth wave, illustrated in Figure 11 and developed in the sawtooth generator illustrated both in Figures 9 and 10, is applied to lead 30 and through relay switch 293 and cathode follower tubes V–10A and V–10B and "auto-manual" switch 228 to the range voltage lead 35. It is noted that the relay 286 is deenergized during the search function, as is also the relay 288.

This sawtooth wave thus appearing on lead 35 serves, together with the triggers applied to terminal 12, to form the early and late gates 260 and 261, respectively, which are applied to mixer stages V–4A and V–4B to develop the range gate of approximately 4 microseconds duration across resistance 266. The range gate developed on resistance 266 and appearing on lead 275 is applied to the suppressor grid of tube V14. The range gate thus applied to the control grid of tube V14 affords continuous monitoring of the approach area, and video applied to the control grid of tube V14 coincidently with the range gate on the suppressor grid, causes the coincident tube V14 to conduct for the duration of such gate (assuming, as explained in detail elsewhere, that there is no signal at that particular time on the rejection bus 40). Thus, when the range delay of the video coincides with the delay of the range gate the tube V14 conducts and a resulting pulse is applied to the control grid of tube V–15A. Tube V–15A is a trigger tube for the blocking oscillator stage V–15A and V–15B, such blocking oscillator stage being gated by the angle gate appearing on lead 56. The signal thus developed on the anode of tube V–15B causes the appearance of a "video on" signal on the cathode of tube V–19A, as described in detail herein. Such video on signal is applied through resistance 440 to the control grid of tube V–19B. The cathode of tube V–19B is grounded and the anode of tube V–19B is connected to the +300 volt source through serially connected resistance 442 and winding of relay 443. Thus, upon application of the video on signal to the control grid of tube V–19B, the relay 443 is energized. To prevent spurious operation of the relay 443 as a result of noise effects, condenser 441 is connected between the control grid of tube V–19B and ground so as to impose a requirement that at least three pulses in the video on signal are required to fully energize tube V–19B and cause operation of relay 443.

When relay 443 is thus energized, it becomes self-holding through the "wave off" ground circuit which includes the serially connected relay switches 330, 342, the normally closed manual wave off switch 445, relay contact 446, resistance 447, winding of relay 443 and the 300 volt source. Also, upon energization of relay 443 the "search-track" relays 288 and 286 are simultaneously energized since they are serially connected in a circuit which includes the aforementioned switches 330, 342, 445, relay contact 448, winding of relay 288, normally closed relay switch 287, winding of relay 286, resistance 450 and the 300 volt source. Upon this energization of relay 286, the connection between the "sweep in" terminal 30 and the range voltage lead 35 is disconnected and the sweep voltage illustrated in Figure 10 is replaced with the output of the coaster circuitry by removing a ground connection from the control grid of tube V9.

*Description of wave off circuitry in Figures 12 and 13 for effecting automatic wave off upon absence of video for predetermined time interval during tracking (no video wave off)*

The purpose of this circuitry is to cause automatic wave off in the event that no video signals are received for a predetermined period of time.

As explained previously, during tracking a video on signal is developed on the cathode of tube V–19A, such signal being a square pulse of high amplitude and sharp definition for control purposes. This video on signal is applied through resistance 331 to the control grid of cathode follower tube V–23A and to the storage condenser 332, thus charging such condenser positively and causing a positive voltage to appear on the condenser 333 having one of its terminals grounded and the other of its terminals connected to the cathode of tube V–23A. The cathode of tube V–23A is connected through resistance 334 to the —150 volt source and to the control grid of tube V–20A through resistance 335 to thereby maintain the control grid of tube V–20A at a positive potential so long as a video signal is present to maintain condensers 332 and 333 charged. The cathode of tube V–20A is connected to one terminal of serially connected resistances 337 and 338, the other terminal of resistance 338 being grounded and the other terminal of resistance 337 being connected to the cathode of tube V–22A and to the control grid of tube V–21A through condenser 326. The control grid of tube V–22A is connected to the anode of tube V–20.

In operation of the circuit which is described, the video on signal applied to the control grid of tube V–23A is stored in condenser 332, and at the cathode of tube V23A. Condenser 333 has a positive voltage, causing the anode voltage of tube V–20A to be maintained at a relatively low value. This anode voltage is applied to the control grid of the cathode follower tube V–22A, so as to control relay control tube V–21A. As the voltage across condensers 332 and 333 decays (as in the cessation of a video on signal), a critical potential at the control grid of tube V–20A is reached, whereupon a regenerative switching action occurs, driving the grid of tube V–21A positive so as to energize the winding of relay 340 which is connected to the cathode of tube V–21A through the wave off switch 321. The resulting surge of current through the winding of relay 340 causes actuation of the normally open relay switch 341 and normally closed relay switch 342 so as to apply a 28 volt alarm signal on the bus 62 and to open the wave off holding circuitry which includes the normally closed switch 342. Upon switch 342 opening, a wave off signal is transmitted from the ground equipment to the airborne equipment in the manner described hereinafter.

*Description of apparatus in Figures 12 and 13 for producing index marks of the character illustrated in Figure 15*

The tracking unit shown in Figure 13 serves to develop index marks of the character shown in Figure 15 which bracket the image of the aircraft on the cathode ray tube screen in the range tracking process.

As described above, during the periods of "search" and "track" conditions, relay 273 remains deenergized, and both the early and late gates 260, 261 developed by tubes V-3A and V-3B are supplied to the mixer stage V-4A, V-4B. The two positive portions of these gates 260, 261 are developed on the common cathode resistance 266 and applied as a single positive-going pulse of lead 275 to trigger the blocking oscillator stage which includes tubes V-16A and V-16B. The output pulses of this stage V-16A, V-16B, highly differentiated, and termed "index marks," are separated into two sets of circuitry. One output is controlled by the position of the tap on the "early amplitude" potentiometer 406, and the second, after passing through a two-microsecond delay line 407, is controlled in amplitude by adjusting the position of the tap on the "late amplitude" potentiometer 408. The input applied to the control grids of the dual mixer tubes V-17A, V-17B, then, consist of two positive-going pulses, separated in time by a delay of two microseconds. These two positive-going pulses are mixed in stage V-17A, V-17B, further differentiated, and applied to the lead 42 for application to an intensity control electrode of the cathode ray tube for display of the position of the range gate as illustrated in Figure 15.

More specifically, the lead 275 is coupled to the control grid of tube V-16A through serially connected condenser 410 and resistance 411. The grid of tube V-16A is returned to ground through serially connected resistances 412, 413, the junction point of which is connected to the negative 150 volt source through resistance 414. Resistance 413 is shunted by condenser 415. The anode of tube V-16A is connected to the positive 300 volt source through a serial circuit which includes the primary transformer winding 416, and index mark control tube V-24A. The cathode of tube V-24A is returned to ground through resistance 417 and is likewise connected to the lead 38 to which a so-called "identification voltage" of 300 volts may be applied from the control panel for purposes of extending the index marks, as indicated in Figure 15, during the time such index marks would otherwise be angle gated by means described presently. It is noted that the control grid of tube V-24A may be selectively connected by means of switch 420 to either the −150 volt source, in which case the blocking oscillator stage V-16A, V-16B is rendered ineffective for its purpose (assuming that no voltage is applied to lead 38), or, in the alternative, the control grid of tube V-24A may be connected through switch 420 to the angle gate lead 56, in which case the blocking oscillator stage V-16A, V-16B is angle gated and the index marks are shortened in angle, as indicated in Figure 15 (assuming that no voltage is applied to lead 38). The control grid of tube V-16B is connected to the −150 volt source through winding 422 and resistance 414. The anode of tube V-16B is connected to the 300 volt source through winding 423, the windings 416, 422 and 423 being, of course, coupled together and constituting a transformer. The cathode of tube V-16B is returned to ground through the potentiometer resistance 406. The tap on resistance 406 is coupled to the control grid of tube V-17B through the differentiating condenser 424. The cathode of tube V-16B is connected through the two microsecond delay line 407 to the ungrounded terminal of resistance 408, the tap of which is coupled to the control grid of tube V-17A through differentiating condenser 425. The cathodes of tubes V-17A and V-17B are returned to ground through load resistance 426. The voltage developed on the cathodes of tubes V-17A and V-17B is coupled to the lead 42 through coupling condenser 428, such line 42 being returned to ground through resistance 429. It is noted that the control grid of tube V-17B is connected to the −150 volt source through serially connected resistances 430 and 431, the junction point of which is bypassed to ground by condenser 432.

In similar manner, the control grid of tube V-17A is also connected to the negative 150 volt source but through a serial circuit which includes the resistance 433, contacts on the manually operable track-cursor switch 284 and resistance 431. Thus during normal operation of the unit, proper bias is applied to both tubes V-17A, V-17B but during "cursor" operation, as explained elsewhere, the switch 284 serves to connect one terminal of resistance 433 directly to the −150 volt source so as to render tube V-17A nonconductive and thus ineffective to pass the late "index marks." In such case, the stage V-17A, V-17B passes only the early "index marks," such index marks being termed in cursor operation the "cursor pulse."

Thus during the search and track function of the equipment two time-spaced index marks appear on lead 42. These index marks are not angle gated during search but are angle gated during the track function. The effect of angle gating of the index marks may be removed by applying a 300 volt potential, i.e., "identification voltage" to lead 38.

It is observed that at the initiation of the search function, a 28 volt potential, originating in the coder unit, is applied over lead 76 and resistance 434 to the junction point of resistances 430 and 431. This potential constitutes an enabling bias, and permits the display of the index marks during the function of "track" and "control."

It is noted that the condenser resistance combination 425, 433, constitutes a differentiating network for the late marks; the condenser resistance combination 424, 430 constitutes a differentiating network for the early marks, and that the condenser resistance combination 428, 429 constitutes a differentiating network for both the early and late marks so that the marks are sharply defined on the cathode ray tube screen.

*Description of circuitry in Figures 12 and 13 for producing both range and angle gating of video, and description of features of rejection bus 40*

The range tracking circuit shown elsewhere and in Figures 12 and 13 is capable of performing its function even though the video supplied thereto over lead 262 is neither range gated nor angle gated but for purposes of accuracy, safety and definition, the video applied to lead 262 is both range and angle gated.

Briefly, the video standardized by the video shaper illustrated in Figure 8 is applied to the control grid of the range coincidence detector tube V14. The suppressor grid of such tube V14 is coupled to the lead 275. When both positive video signals and positive range gates are present on control grid and suppressor grid of tube V14 contemporaneously, tube V14 conducts and the resulting pulse of current in the transformer 341 results in application of a pulse to the control grid of tube V-15A. The anode supply for tube V-15A comprises the angle gating voltages applied to lead 56. Thus when the range gate video pulse developed on the grid of tube V-15A is coincident with the angle gate appearing on lead 56 the tube V15 conducts to cause a pulse of current to flow through the transformer 343 and a resulting range and angle gated video pulse to appear on the control grid of tube V-15B. The resulting range and angle gate video signal appearing on the cathode of tube V-15B is applied to the lead 262 for purposes of effecting range tracking in the manner described previously.

The operation of this circuit may, however, be modified by signals developed in other tracking units and appearing on the rejection bus 40. Such signals appearing on the rejection bus 40 may render this circuit ineffective when such signals are coincident with the range gates applied to the suppressor grid of tube V14.

More specifically, the video appearing on lead 72 is transferred through coupling condenser 344 to the control grid of tube V14, such control grid being connected to the −150 volt source through serially connected resistances 345 and 346. The junction point of these two resistances 345, 346 is bypassed to ground by bypass condenser 347. The cathode of tube V14 is grounded. The anode of tube V14 is connected through primary winding 349 to the positive 150 volt source. The suppressor grid of tube V14 is coupled to the range gate lead 275 through the serially connected resistance 350 and condenser 351, the junction point of resistance 350 and condenser 351 being returned to ground through the serially connected resistances 352 and 353. The junction point of resistances 352 and 353 is connected to the ungrounded terminal of condenser 347.

Also coupled to the suppressor grid of tube V14 is the rejection bus 40 for purposes of producing the aforementioned overriding control effect occurring when pulses on the rejection bus 40 appear coincidently with range gates on lead 275. This is for the purpose of preventing two tracking units from tracking the same aircraft. For this purpose, the suppressor grid of tube V14 is connected to the anodes of inverter tubes V-2A and V-2B. The cathodes of inverter tubes V-2A and V-2B are interconnected and returned to ground through resistance 355 which is shunted by condenser 356. Likewise, these cathodes are connected to the −150 volt source through resistance 359A. The control grids of inverter tubes V-2A and V-2B are connected through resistance 357 to the −150 volt source and are coupled by means of condenser 358 to the stationary contact 367 of the single pole double throw relay switch 360. This relay switch 360 is a part of the search-track relay 288. The tubes V-2A and V-2B are thus tubes for the purpose of converting positive signals on the rejection bus 40 and applying the same as a negative pulse to the suppressor grid of tube V14 during, of course, the search function of the unit shown in Figure 13.

In multi-plane tracking, it is understood that tracking units of the character shown in Figure 13 are duplicated and that the rejection bus 40 of each tracking unit is interconnected for the purpose of preventing more than one tracking unit tracking the same aircraft. In this respect it is noted that while a tracking unit is performing its search function, it is receiving information, i.e., an angle gated range gate, over the bus 40 from other units while such other units are performing their track function; and that while the present unit is in the track function, it is supplying the same type of information, i.e., an angle gated range gate, to other units performing the search function so that such other units will correspondingly not track the same aircraft.

For purposes of developing such information, i.e., an angle gated range gate, the sube V13 is connected to receive angle gates on its anode and range gates on its control grid. More specifically, tube V13 is connected as a cathode follower coincident tube and has its anode connected to the lead 56 for receiving angle gates. The control grid of tube V13 is connected to the range gate lead 275 through serially connected resistance 360 and coupling condenser 361, the junction point of which is connected to the −150 volt source through serially connected resistances 362 and 363. The cathode of tube V13 is returned to ground through load resistance 364 and is connected to the stationary terminal 366 of switch 360 through condenser 369 and also to the so-called range gated automatic gain control lead RGAGC 40A. It is noted that the tube V13 requires for its operation, a 28 volt enabling bias and that such bias is supplied upon energization of relay 370 during the track function of the equipment. In order to energize relay 370 a 28 volt range gate interlock is supplied from the coder unit to the lead 74.

When relay 370 is energized, the 28 volts are applied through the relay switch 371 and resistance 372 to the junction point of resistances 362 and 363 for the aforementioned purpose of rendering tube V13 operative.

Returning to the description of the connections to tube V14, the output of such tube is coupled through transformer 341 to the control grid of tube V-15A. For that purpose, the cathode of tube V-15A is grounded and its control grid is returned to ground through the serially connected transformer winding 375 and resistance 376, the junction point of which is connected to the −150 volt source through resistance 377. The anode of tube V-15A is connected through the primary winding 379 of the transformer 343 to the angle gate voltage lead 56. The control grid of tube V-15B is serially connected with transformer winding 380 and resistance 377 to the −150 volt source. The anode of tube V-15B is connected through transformer winding 382 to the positive 300 volt source. The cathode of tube V-15B is returned to ground through load resistance 378 and is likewise connected to the lead 262 for purposes of applying both range and angle gated video to the tracking circuit described under a different heading. A condenser 381 is connected between the cathode of tube V-15B and one terminal of resistance 377.

In order to develop the video on signal described under a different heading, the range and angle gated video appearing in inverted form on the anode of tube V-15B is transferred to the cathode of tube V-18A through coupling condenser 383.

Recapitulating, standardized video appearing on lead 72 is applied to the control grid of coincidence tube V14. In the absence of a rejection gate which may be on the rejection bus 40, and at the coincidence of the delay of the range gate applied over lead 275 to the suppressor grid of tube V14 with the duration of the video, a signal is passed by the coincidence detector V14 and applied to the blocking oscillator stage V15A, V-15B. This blocking oscillator stage is angle gated by the +240 volt angle gate developed in the computer unit and appearing on lead 56. The output from the blocking oscillator stage V-15A, V-15B thus occurs only when the following conditions are fulfilled: (1) The range delay of the video coincides with the delay of the range gate; (2) During search condition there is no signal upon the rejection bus at the point determined by requirement No. 1; (3) The video occurs within the angle gate while the unit is in its track or control function.

Video meeting these three conditions appears on the cathode of tube V-15B, i.e., lead 262 has a standardized pulse and is applied simultaneously to the control grids of early and late detector tubes V5 and V6 in the range tracking circuit.

*Description of normal automatic touchdown wave off circuitry illustrated in Figure 13*

The purpose of the circuitry described under this heading is to cause transmission of wave off signals to the tracked aircraft when such aircraft reaches touchdown.

While the aircraft is being tracked, as described above, a "tracking on" signal is developed on lead 66 and such signal is applied to relay 243 to energize the same. Energization of relay 243 results in application of the range voltage appearing on lead 35 to the control grid of tube V-20B through the normally open switch of relay 243 and the serially connected resistance 312. In order to control the point at which this circuitry operates with respect to the aircraft touchdown point, the control grid of tube V-20B is connected to an adjustable tap on the potentiometer resistance 308, such resistance being connected in a voltage dividing circuit which includes the serially connected 300 volt source 309, resistance 311, and resistance 308. Tube V-20B is connected as a D.-C. amplifier with its cathode returned to ground through resistance 313. The anode of tube V-20B is supplied with space current from the +300 volt source through resistance 314. The anode of tube V-20B is likewise connected to the −150 volt source through serially connected resistances 315 and 316, resistance 315 being shunted by condenser 317. The voltage developed on the anode of tube V-20B is transferred through condenser 318 to the control grid of tube V-21B which is connected as a cathode follower, the cathode of tube V-21B being returned to ground through the winding of relay 320, assuming that the automatic wave off switch 321 is in its on position. The control grid of tube V-21B is returned to the —150 volt source through serially connected resistances 322 and 323. The junction point of resistances 322 and 323 is connected to the junction point of resistances 324 and 325, the other terminal of resistance 325 being grounded and the terminal of resistance 324 being connected to the control grid of tube V-21A and through condenser 326 to the cathode of tube V-22B. The anode of tube V-22B is supplied with space current from the 300 volt source serially connected with resistance 328.

It will be observed that the above mentioned connections provide a regenerative feed back path for effecting a regenerative switching action.

Thus, as range voltage falls when and as the tracked aircraft approaches touchdown, a critical value of the voltage on the control grid of tube V-20B is realized, whereupon a regenerative switching action occurs, driving the grid of tube V-21B positive. The resulting surge of cathode current flowing through tube V-21B energizes relay 320 to cause opening of its normally closed switch 330 to thereby open the wave off holding circuitry which is serially connected with such switch 330. Opening of switch 330 results, as explained more fully hereinafter, in the transmission of a wave off signal to the aircraft to effect a complete wave off condition of the ground and airborne equipment.

*Description of means for applying range gate to lead 44 in Figures 12 and 13*

As described above, the range gate appearing on lead 275 and developed across the common cathode load resistance 266 constitutes, in effect, the positive portions of both early and late gates 260 and 261. The range gate thus appearing on lead 275 is applied through condenser 361 to the control grid of cathode follower tube V-24B. A positive range gate is thus developed on the cathode load resistance 436 and applied through coupling condenser 437 to the range gate lead 44 for purposes of effecting certain control operations.

The computer circuitry is illustrated in Figures 18A, 18B and 19. In general, the computer performs six major functions, namely, to produce (1) angle voltage level shifting, (2) the computation of an "ideal glide path," (3) angle air tracking, (4) course softening, (5) excess air wave off, and (6) the generation of an angle gate. In general, the azimuth and elevation angle voltages applied to the terminals 18 and 20, respectively, are shifted in level as a step in the glide path computation process. Inversion of azimuth angle voltage, made possible by the two-position switch SW-3001, permits the selection of either a "left runway" or a "right runway" approach; i.e., the radar equipment may be placed either on the left or on the right of the runway.

Range voltage generated in the tracking units described in connection with Figures 12 and 13 and the range of a tracked aircraft is applied to the computer glidepath reference generator which in general includes the input terminal 82 and the stages 451 (V16A), 452 (V16B), 453 (V17A) and 454 (V17B). Such reference generator includes the nonlinear thyrite resistances 456, 457 so as to impart a nonlinear characteristic to the range voltage applied to terminal 82. The modified range voltage is added to the shifted az.–el. voltages resulting in the generation of an alternating voltage representing, at the zero cross-over points, an "ideal" glide path which is so adjusted as to coincide with an actual physical "ideal" approach to a given air field. Such alternating voltages, for azimuth purposes, appear on the lead 459 and, for elevation purposes, appear on the lead 460. The glide path generated by this circuitry may be displayed upon the az.–el. monitor scope during the "search" condition of the particular channel. These alternating voltages, for azimuth purposes, appear on the lead 462 and, for elevation purposes, appear on the lead 463.

The voltage appearing on the leads 462, 463 represent, in one instance, modified range voltage added algebraically to level shifted azimuth voltage and, in the second instance, range voltage modified in a different manner added algebraically to level shifted elevation angle voltage.

In general, such alternating voltages with a periodicity of two cycles per second are applied, respectively, from their leads 462 and 463 to cathode follower stages 465 and 466, each of such cathode follower stages forming an input circuit for the azimuth servo loop 467 and elevation servo loop 468. Briefly, such servo loops produce a voltage on the leads 469, 470 of servo loops 467, 468, respectively, such voltage on leads 469 and 470 constituting a substantially continuous voltage which represents the position error of the tracked aircraft in azimuth and elevation, respectively. Such voltages appearing on leads 469 and 470 are indicated on the cross pointer meter 471 and are utilized to modulate a carrier wave which is transmitted from the ground station to the aircraft for purposes of controlling the flight of the aircraft. The alternating azimuth and elevation voltages appearing in the output circuits of the cathode follower stages 465 and 466 are used to form azimuth and elevation angle gates, such angle gates being applied to the range tracking circuitry illustrated in Figures 12 and 13. Briefly, for purposes of developing such azimuth and elevation angle gates, level shifting potentiometers 472 and 473 are provided with their taps being connected to stationary contacts of the single-pole double-throw relay switch 474 serving to alternately apply the azimuth and elevation alternating voltages to the differential amplifier stage 475 (comprising tubes V12A and V12B) in the angle gate generator 477. The output of the gate generator 477 appears alternately as an azimuth and an elevation angle gate on lead 56. Azimuth angle voltage appearing on lead 18 is applied to the control grid of cathode follower tube 478. Such azimuth angle voltage is shifted in level and appears on lead 479 where the same is mixed on the control grid of cathode follower mixer tube 480 with the modified range voltage which appears on lead 459. In the left position of switch SW-3001, the level shifted azimuth voltage is mixed directly with the modified range voltage without inversion; but, in the right position of switch SW-3001, the azimuth angle voltage is not only level shifted but also inverted before being mixed with the modified range voltage appearing on lead 459.

To achieve these results the following circuitry is associated with tube 478. The cathode of tube 478 is returned to the negative ungrounded terminal of voltage source 481 through a series circuit which includes resistances 482, 483, 484, 485 and 486. The resistance 483 constitutes a so-called "touchdown adjustment for left runway operation" and has its adjustable tap connected to the left stationary contact of switch SW-3001 through the serially connected resistance 489 and adjustable resistance 490. The movable contact of switch SW-3001 is connected to lead 479 which in turn is connected directly to the control grid of the cathode follower mixer tube 480. The resistance branch comprising resistances 482, 483 and 484 has connected in shunt therewith the serially connected resistances 492 and 493, the resistance 493 comprising a potentiometer type of resistance tremed the "touchdown adjustment for right runway operation" and has its movable tap connected to the control grid of the inverter tube 494 through resistance 495. Tube 494 is useful only during right runway operation; i.e., when the radar equipment is located on the right of the runway. The anode of tube 494 (V3A) is connected through the load resistance 496 to the positive terminal of a voltage source (not shown) and is connected directly to the control grid of tube 498 (V3B). The cathode of tube 494 is returned to ground through resistance 500 and is connected to the cathode of tube 498 through resistance 502. Tube 498 constitutes a cathode follower with its cathode connected to the ungrounded terminal of voltage source 504 through serially connected resistances 506 and 507. The junction point of resistances 506 and 507 is connected on the one hand through resistance 508 to the control grid of tube 494; and on the other hand such junction point is connected through serially connected resistances 570 and 571 to the right stationary contact of switch SW–3001.

In order to stabilize the potential appearing on the cathode of the input tube 478, a voltage regulator tube 513 is serially connected between the cathode of tube 478 and the junction point of resistances 485 and 486.

Thus, the operation of the azimuth angle voltage mixing circuit described immediately above is as follows. Azimuth angle scanning voltages varying from 52 volts to 2 volts and applied to terminal 18 appear on the grid of the cathode follower tube 478 (V1A). The output from the stage 478 is derived from its cathode and shifted downward in level through circuitry including voltage regulator tube 513 (V2), which stabilizes the voltage drop across the voltage dropping resistance network. When switch SW–3001 (runway select) is set to the "left position" (for operation of the radar installation at the left side of the runway), the level shifted azimuth angle voltage is resistively mixed with the reference voltage; i.e., modified range voltage which is derived in the output circuit of the cathode follower tube V16B, and applied to the control grid of cathode follower tube V80 (V1B) over lead 459 which is serially connected with resistance 515, such resistance 515 being shunted by condenser 516. The output from the cathode follower stage 480 and appearing at the junction point of resistances 518 and 519 is applied through the serially connected resistances 520 and 521 to the azimuth angle tracking circuit; i.e., to the control grid of tube 465. Potentiometer resistance 483, the so-called "touchdown adjustment for left runway operation," is adjusted to provide zero azimuth angle voltage when the angular position of the radiated antenna beam passes through the aircraft touchdown point. At the same time the tap on potentiometer resistance 490 is adjusted to provide the proper excursion of the level shifted angle voltage which is added to the reference voltage; i.e., the modified range voltage.

In right runway operation, i.e., when the runway select switch SW–3001 is set to the "right position," level shifted azimuth angle voltage appearing on the tap of resistance 493 is applied to the inverter stage 494 (V3A). The output of stage 494 is applied to the cathode follower stage 498 (V3B) and varied by series resistance 511, the so-called "position adjust right runway," which produces the result identical to that produced by resistance 490 in left runway operation.

For purposes of producing level shifted and inverted elevation voltage for mixing with reference voltage, the elevation angle voltage is applied to terminal 20, such terminal being connected to the control grid of inverter tube 522 through resistance 524. The cathode of tube 522 is returned to ground through resistance 525 and is connected to the cathode of tube 526 through resistance 528. The tube 526 is a cathode follower and has its cathode connected to the negative ungrounded terminal of voltage source 530 through serially connected resistances 531 and 532. The junction point of resistances 531 and 532 is connected on the one hand through resistance 533 to the control grid of tube 522; and on the other hand such junction point is connected to the control grid of the cathode follower stage 534. The cathode of stage 534 is returned through serially connected resistances 536, 537 and 538 to the —150 volt source. The resistance 537 is a potentiometer resistance and serves as a touchdown adjustment, such resistance 537 having its adjustable tap connected through resistance 540 to the control grid of cathode follower mixer stage 541. Tube 541 has its cathode connected through serially connected resistances 543 and 544 to the —150 volt source. The junction point of resistances 543, 544 is connected through lead 463 and serially connected resistances 545 and 546 to the elevation angle tracking circuit; i.e., to the control grid of tube 466. The resistance 546 is shunted by condenser 548.

Thus, elevation angle voltage varying from 2 to 52 volts, depending on the angular position of the radiated antenna beam, is applied to the control grid of the inverter amplifier tube 522 the output of which is shifted downward in level in the cathode circuit of cathode follower tube 526. This level shifted elevation voltage is shifted further downward in the cathode circuit of cathode follower stage 534, and potentiometer resistance 537 is adjusted to provide a zero potential when the antenna beam passes through the elevation touchdown position. This level shifted output from cathode follower stage 534 is added to the reference voltage; i.e., modified range voltage appearing on lead 550. Such modified range voltage is applied through the two-position glide path select switch SW–3001. Switch SW–3001 allows inspection of one of two series potentiometer resistances 551 or 552. Either of these two resistances allows an adjustment of the output of the reference generator for a given input, and therefore an adjustment of the angle of the computed glide path.

The range voltage generated in the range tracking unit illustrated in Figures 12 and 13 is applied to terminal 82, such range voltage serving as a measure of the range of the aircraft being tracked. Range voltage thus appearing on terminal 82 is applied to the control grid of the cathode follower tube 451 through the tap on the so-called "range factor" of potentiometer resistance 560, one terminal of such resistance 560 being grounded. The cathode of tube 451 is connected through series resistances 562 and 563 to a —150 volt source. A condenser 564 is connected between terminal 82 and the control grid of tube 451. The junction point of resistances 562 and 563 is connected through series resistances 565 and 566 to the control grid of tube 568 (V17A), such resistances 565 and 566 being shunted by condenser 569. The control grid of tube 568 is returned to ground through the "L" thyrite resistance 456. The cathode of the cathode follower stage 568 is connected through series resistances 570, 571 and 572 to a —150 volt source. The adjustable tap on resistance 571 is connected through adjustable resistance 573 to the control grid of the cathode follower tube 575 (V17B). Condenser 577 is connected between the tap on resistance 571 and the tap on resistance 573. The control grid of cathode follower tube 575 is returned to ground through the "M" thyrite resistance 457 and is connected to the control grid of the cathode follower tube 452. The cathode of tube 452 is connected through series resistances 578 and 579 to a —150 volt source. The cathode of tube 575 is connected through series resistances 580 and 581 to a —150 volt source, and the junction point of such resistances 580 and 581 is connected to the movable contact of the glide path select switch SW–3001 for supplying modified range voltage to the control grid of tube 541 where such modified range voltage is mixed with level shifted elevation angle voltage. On the other hand, the output appearing at the junction point of resistances 578 and 579 is transferred over lead 459 and resistance 515 to the control grid of tube 480 to which is also applied level shifted azimuth angle voltage.

Thus, in operation of the reference voltage generating beams described above, range voltage, as generated in the tracking unit illustrated in Figures 12 and 13, is applied to the cathode follower tube 451 through the range factor resistance 450, the tap on resistance 560 being adjusted to determine the portion of the full excursion of range voltage applied to the reference generator circuitry. This range voltage is shifted downward in level at the cathode of tube 451 and applied to the control grid of the cathode follower tube 568. The potential of the control grid of tube 568, however, is modified by the thyrite resistance 456. The characteristics of this voltage modification are such that increasing applied potentials do not produce the same relative increase in voltage drop across resistance 456. Stated in a different manner, additional increments of input voltage are not matched by equal increases in voltage at the cathode of tube 568. The output of tube 568 is applied to the control grid of cathode follower tube 575 where further modifications are imparted by the thyrite resistance 457. Thyrite resistances 456 and 457 are such that the added characteristics imposed by these two elements cause the voltage variations following the general equation $E_r = (E_1)(1-1/n)$.

*Theoretical considerations in establishing ideal glidepath (elevation) and ideal course (azimuth) lines with reference to Figures 21 and 22*

It has been stated that flight errors are computed from predetermined ideal glidepath (elevation) and course (azimuth) lines, which are functions of a single general expression involving the geometry of runway approaches. The following paragraphs are devoted to a discussion of the derivation of this general reference function, and to its application within the AGCA system.

The problems of reference voltage generation and error computation are greatly simplified by generalizing the equations for azimuth and elevation glidepaths. Referring to Figure 20, the angular position of the aircraft is shown to be equal to $\sin^{-1} a/R$. For small angles, the value of the sine of the angle is approximately equal to the angle expressed in radians, and the position angle for small angles is equal to:

$$\theta = K\, a/R \qquad (1)$$

where $K$ = degrees per radian.

This is the general equation for the reference angle of the aircraft, with respect to a line extending from the radar installation parallel to the runway. If the numerator and denominator are multiplied by ($R_{td}$), the following relationship is obtained:

$$\theta = (K\, a/R)(R_{td}/R_{td}) \qquad (2)$$

or $$\theta = (K\, a/R_{td})(R_{td}/R) \qquad (3)$$

arbitrarily equating:

$$R/R_{td} = "n" \qquad (4)$$

which states that the factor "$n$" is now equal to the range of the aircraft from the radar installation divided by the range of the radar installation from the point of touchdown. This states that "$n$," which may be called a range ratio factor, is equal to unity when the aircraft is at the point of touchdown. In the further development of the equation, the distance from the radar installation to touchdown is the unit "$n$," and the range to the aircraft will be expressed in terms of units, $n_1$, $n_2$ etc., representing this distance. Equation 3 now becomes:

$$\theta = (K\, a/R_{td})(1/n) \qquad (5)$$

but $$K\, a/R_{td} = \theta_{td} \qquad (6)$$

and therefore, $$\theta = \theta_{td}(1/n) \qquad (7)$$

Referring again to Figure 20, it is seen that as the range increases from $n_1$ to $n_2$, to $n_3$, and to $n_4$, it increases by multiples of 2, 3 and 4 times the range to touchdown. The angle $\theta$ consequently decreases to ½, ⅓, and ¼ its value at touchdown. This angular variation has the form, therefore, of the expression $1/n$, for values of "$n$" from one to ten, considering the range of the system to be ten miles. The reference angle for all values of range may now be expressed as:

$$\theta_{ref} = \theta_{td}(1/n) \qquad (8)$$

This angle, $\theta_{ref}$, may be expressed as a position voltage:

$$E_p = (K_{az}\theta_{td})(1/n) \qquad (9)$$

where $$K_{az} = \text{volts/degree in azimuth} \qquad (10)$$

a factor which is dependent upon amplification factors and potentiometer adjustments in the control circuits. In Equation 10, position voltage will approach zero at touchdown if the term $K_{az}\theta_{td}$ is subtracted from the equation:

$$E_p = (K_{az}\theta_{td})(1/n) - (K_{az}\theta_{td}) \qquad (11)$$

or $$E_p = (K_{az}\theta_{td})(1/n - 1) \qquad (12)$$

As "$n$" approaches infinity, $E_p$ will approach $(-K_{az}\theta_{td})$; as "$n$" approaches unity, $E_p$ approaches zero. The elevation reference angle will be developed by the same process. Offset of the radar installation from the runway is not considered, as the errors involved are negligible. Again using the glidepath parallel as a reference, it will be noted that, for the elevation case, the position angles are in the fourth quadrant instead of the first. General equations will be:

$$E_p = (-\theta_{td})(K_{el})(1/n - 1) \qquad (13)$$

or $$E_p = (K'_{el}\theta_{td})(1 - 1/n) \qquad (14)$$

Comparing the general equations for azimuth and elevation:

Azimuth:

$$E_p = (K'_{az}\theta_{td})(1/n - 1) \qquad (15)$$

where $K'_{az} = 2.5$ volts per degree (maximum), and $$\theta_{td} = 4 - 10 \qquad (16)$$

Elevation:

$$E_p = (K'_{el}\theta_{td})(1 - 1/n) \qquad (17)$$

where $K'_{el} = 7.14$ volts per degree (maximum), and $\theta_{td} = 2 - 3$ degrees.

It may be noted that $K'_{az}\theta_{td}$ is in the same voltage region as $K'_{el}\theta_{td}$. They are of opposite polarity because one is a function of $(1/n - 1)$ and the other a function of $(1 - 1/n)$. If elevation position voltage is applied to an amplifier with a gain of $-1$, the elevation reference voltage will be:

$$E_p = (K'_{el}\theta_{td})(1/n - 1) \qquad (18)$$

The equations for azimuth and elevation reference voltage for an aircraft approaching touchdown on the glidepath are now of the same form:

$$E_p = (K\theta_{td})(1/n - 1) \qquad (19)$$

If the factors $K'_{az}$ and $K'_{el}$ are adjusted to have the same scale of values, it is possible to generate a single reference voltage for both azimuth and elevation:

$$E_p = (K'_{az}\theta_{td})(1/n - 1) \qquad (20)$$
$$E_p = (K'_{el}\theta_{td})(1/n - 1) \qquad (21)$$
$$K'_{az}/K'_{el} = \theta_{td}/\theta_{td} \qquad (22)$$

The reference angle computer must generate a voltage:

$$E_{ref} = E_a(1/n - 1) \qquad (23)$$

where $$E_a - K'_{az}\theta_{td} = K'_{el}\theta_{td} \qquad (24)$$

Since $K'_{az}$ and $K'_{el}$ are negative (refer to Figure 22):

$$E_{ref} = E_a(1 - 1_n) \qquad (25)$$

The azimuth and elevation position voltages have positive polarity. The reference voltage is also of positive polarity as seen from Equation 25. Referring to Figure 22, the azimuth position voltage is shifted downward in level so that the position voltage for zero range will be zero volts. The elevation position voltage will be shifted downward and inverted, so that its form is as shown in Figure 22. Since both voltages will then have the same form, they may be adjusted to the same scale, as noted above. If $E_a$ (Equation 25) is adjusted to equal $(K\theta_{td})$, then the equations for error as the aircraft approaches touchdown on the runway centerline are:

$$E_p \div E_{ref} = 0 \qquad (26)$$

or $$K'\theta_{td}(1/n-1) \div E_a(1-1/n) = 0 \qquad (27)$$

The elevation and azimuth angle tracking circuits are substantially identical in nature and function and for that reason, the following detailed description of the elevation angle tracking circuit suffices to describe the azimuth angle tracking circuit.

The elevation angle tracking circuit includes the cathode follower tube 466 (V-20A), the amplifier tubes 600, 601 (V-31A, V-31B), the clamp tubes 604, 605 (V-21A, V-21B), the cathode follower tube 606 (V-33B), the cathode follower stage 607 (V-33A), the limiter tubes 608, 609 (V-32A, V-32B), the amplifier tubes 612, 613 (V-22A, V-22B) and the cathode follower tube 614 (V-20A).

The elevation angle tracking circuit comprises a servo loop with a feedback path provided by the lead 470. The voltage developed on lead 470 is continuous in nature and represents the position error of the tracked aircraft. The control grid of cathode follower tube 466 is connected to lead 470 through resistance 620, so that the same is sensitive to position error; and such control grid is likewise connected with resistance 546 so as to be sensitive to the algebraic sum of reference voltage and level shift, i.e., modified range voltage and level shifted elevation voltage. This voltage applied through resistance 546 is undulatory in character and its zero value, as mentioned previously, corresponds to a point on the pre-determined glidepath. The cathode of tube 466 is connected to a minus 150 volt source through three parallel connected resistances and resistance 620, such parallel resistances comprising resistances 621, 622, 623. The tap on resistance 621 is connected to elevation angle gate generating means as described elsewhere herein for purpose of producing an angle gate, which in turn, is applied to the range tracking unit for forming angle gated video.

The tap on resistance 623 is connected to the control grid of the amplifier tube 600 through resistance 625. The cathodes of tubes 600 and 601 are both grounded and the anode of 600 is connected through resistance 626 to a positive 300 volt source. The anode of tube 600 is connected to the control grid of tube 601 through a network which includes the parallel connected resistance 628 and condenser 629. The control grid of tube 601 is connected through resistance 630 to the —150 volt source and such grid is also bypassed to ground by means of condenser 632. The anode on tube 601 is connected through resistance 632 to the positive 300 volt source and the voltage developed on such anode is transferred through resistance 635 to, on the one hand, the cathode of tube 604 (V-21A) and on the other hand, to the anode of tube 605 (V-21B). The control grids of tubes 604 and 605 are connected through resistances 640, 641 respectively to lead 642, to which in turn is applied the video on signal from terminal 84. Such video on signal is described elsewhere herein, is developed in the tracking unit and is present during the time "radar hits" are being made on the tracked aircraft. The lead 642 is connected through resistance 644 to a —150 volt source to provide bias for the control grids of tubes 604 and 605. The anode of tube 604 and cathode of tube 605 are connected to the control grid of tube 606 and are returned to ground, through an integrating network which comprises a serially connected condenser 646 and resistance 647.

The tube 606 is a cathode follower and has its cathode returned to ground through resistance 649. Also, such cathode is connected to a —150 volt source through serially connected resistances 650 and 651. The resistance 650 is connected in shunt with condenser 652. The junction point of resistances 650, 651 is connected through resistance 654 to the control grid of tube 612.

The anode of tube 612 is connected through load resistance 656 to a positive 300 volt source and is likewise connected to the control grid of tube 613. The cathode of 612 is returned to ground with resistance 658. Condenser 659 is connected between the control grid 612 and the cathode of tube 613.

The tube 613 is a cathode follower and has its cathode returned to ground through the serially connected resistances 670 and 658. Also, the cathode of tube 613 is connected to a —150 volt source through the serially connected resistances 672, 673, 674 and 675. The junction point of resistances 674 and 675, is connected through the single pole double throw relay switch 680 (during tracking) to the control grid of the cathode follower tube 614. The adjustable tap on resistance 673 is connected to the movable contact of the single pole double throw relay switch 681.

The cathode of tube 614 is connected through lead 470 and resistance 620 to the control grid of tube 466 to complete a feedback loop. Also, the cathode of tube 614 is connected to an adjustable tap on the resistance 682, one terminal of resistance 682 being connected to resistance 683, and the other terminal of resistance 682 being connected to lead 684, for purposes of transferring air voltage to the air indicator.

*Angle gate generator in computer in Figure 18B*

The circuitry described under this heading is used to provide a so-called angle gate which is applied to the range tracking unit shown in detail in Figures 12 and 13. In general, the purpose of this angle gate is for purposes of gating the video signals applied to the range tracking circuit in such a manner that such video signals are allowed to pass to the tracking circuit only during the time during which radar hits are being made on an aircraft being tracked, as illustrated in Figure 20.

It is noted that the ideal course of glide-path, as described elsewhere herein, is represented by the zero voltage crossover points on alternating voltages, one corresponding to azimuth, i.e., course, and the other corresponding to elevation, i.e., glidepath. These alternating voltages comprise, for azimuth purposes, the addition of level shifted azimuth angle voltage to the reference voltage, i.e., modified range voltage; and, for elevation purposes, comprise the algebraic sum of level shifted elevation angle voltage and the reference voltage, i.e., the modified range voltage.

The angle tracking servos have supplied thereto these two different alternating voltages representing at the zero voltage crossover points an ideal glidepath and course which are so adjusted to coincide with an actual physical "ideal" approach to a given airfield. The voltage on lead 469 in the case of azimuth and lead 470 in the case of elevation represents the error of the aircraft with respect to such ideal course or glidepath as described previously herein. The grid of tube 465, being connected to the junction of resistors 521 and 516, bears a voltage which is the sum of the aforementioned alternating voltage and the aforementioned error voltage. This grid voltage is therefore an alternating voltage whose zero crossover point represents the time the beam crosses the aircraft, whether or not the aircraft is on the ideal course, provided, of course, that the aircraft is being tracked. Likewise, in the elevation case, the voltage at the grid of tube 466 is an alternating voltage whose zero crossover point defines the position of the aircraft. These voltages are applied to opposite stationary contacts of the relay switch of the az.-el. relay switch 474 and are supplied, for azimuth purposes, from lead 840 which is connected to the adjustable tap on the potentiometer resistance 472; and for elevation purposes, such alternating voltage is supplied over lead 841 which is connected to the adjustable tap on the potentiometer resistance 621.

The movable contact of switch 474 is connected through resistance 842 to the control grid of the first tube 844 and the differential amplifier 475. Tube 846 comprises a second tube of such differential amplifier. The cathodes of tubes 844 and 846 are returned to ground through a common resistance 847. The anode of tube 844 is connected to a +150 volt source through resistance 848 and is connected to the control grid of tube 850. The control grid of tube 846 is grounded and its anode is connected to a +150 volt source through resistance 851 and such anode is also connected to the control grid of tube 853.

In general, the circuitry associated with the differential amplifier 475 is so arranged that the output of both sections 844, 846 is zero for zero input at the control grid of tube 844. For other values of input voltage, the output of one of the sections 844, 846 is positive, resulting in a waveform on the connected cathodes of tubes 855 of the character illustrated at 856. This waveform 856 is shifted in level through circuitry including the voltage regulator tube 858 and is made available in two circuit branches through adjustable tubes on the resistances 860, 861.

For this purpose, the tubes 850, 855 are cathode followers and each have their cathode connected to one terminal on tube 858, the other terminal on tube 858 being connected to a −150 volt series through resistances 864, 861, and 865. Resistance 860 is connected in shunt with resistance 861. The taps on resistances 860 and 861 are connected to opposite stationary contacts of the az.-el. relay switch 867 which has its stationary contact returned to ground through resistance 870 and which is connected to the control grid of tube 872 through resistance 873.

Tube 872 has its anode connected to the control grid of tube 875 and such anode is likewise connected to a +300 volt source through resistance 876. The cathode of tube 872 is connected through resistance 877 to a −150 volt source and to one terminal of the neon tube 878; such cathode is also connected to a stationary contact of the relay switch 879.

The tube 875 has its anode connected to a +300 volt source and its cathode returned to ground through resistance 881, such cathode being also connected to terminal 56 which constitutes the az.-el. angle gate terminal.

The width of the angle gate produced by this circuitry is now described. The point at which voltage waveform 856 (approaching zero from either direction) is effective in cutting off the flow of space current to tube 872 is separately determined for the azimuth and elevation functions by adjustment of the taps on resistances 861 and 860. Application of the negative waveform 856 to the control grid 872 results in a positive D.-C. gate on the cathode of cathode tube 875 of the character illustrated at 882.

It is observed that the angle gating circuitry described above is operative only after initiation of the "control" condition, i.e., after confirmation by the aircraft, at which time a ground is removed from the cathode of tube 872, i.e., upon application of the +28 volt confirmation voltage to the relay winding 885, which has associated therewith the aforementioned switch 879.

By thus providing the angle gate 882 and applying the same to the tracking unit as described elsewhere herein, gating of azimuth and elevation video targets is achieved. Such gating is desirable to prevent the tracking of undesired targets at the same range but at varying angles from the desired video.

*Automatic waveoff in response to flight errors exceeding a predetermined value for a predetermined time with respect to Figure 18*

The safety feature incorporated in the present arrangement is that a "waveoff" signal may be initiated through the failure of an aircraft to respond to transmitted control signals. This error waveoff signal, which is transmitted to the aircraft, releases the autopilot from AGCA control and a maximum "fly-up" signal is transmitted to the aircraft.

The circuitry for accomplishing this purpose whereby flight errors exceeding a predetermined value for a predetermined time actuate the "waveoff" functions of the system, is shown in detail in Figure 18. In general, circuitry is provided for the origination of this "waveoff" function by two identical channels for the azimuth and elevation control functions respectively. Since these two channels are substantially identical, a description of the azimuth channel will suffice to describe the elevation channel.

This error waveoff circuitry in Figure 18A includes tubes 890, 891, 892, 893 and 894 in the azimuth channel; and in the elevation channel the corresponding tubes are 900, 901, 902, 903 and 904 respectively. Azimuth error voltages are determined by the azimuth angle error tracking circuit appearing on lead 906, while corresponding elevation error position signals appear on the lead 907.

Azimuth error voltages ranging in value from +6 volts to −6 volts, D.-C., are transferred to the control grids of tubes 890 and 891. More specifically, lead 906 is connected through the unidirectional conducting crystal 908 to the ungrounded terminal of the so-called azimuth waveoff symmetry resistance 910, which has its tap connected through resistance 911 to the control grid of tube 891. Likewise, the lead 906 is connected through the unidirectional conducting crystal 912 to the control grid of tube 890 and to the ungrounded terminal of resistance 913.

The anode of tube 890 is connected to a +150 volt source and the cathodes of both tubes 890 and 891 are returned to ground through the common resistance 915.

The anode of tube 891 is connected to a +150 volt source through resistance 917 and is also connected to a −150 volt source through the serially connected resistances 920, 921 and 922. Condenser 923 is connected between the anode and control grid of tube 891 to provide a delayed action, as described hereinafter.

The tap on resistance 921 is connected through resistance 925 to the control grid of tube 892 which has its cathode returned to ground through resistance 926 and which has its anode connected on the one end, to the control grid of tube 893, and on the other end to the +350 volt source through resistance 928. The cathode of tube 893 is returned to ground through series resistances 930 and 926 and is connected to the control grid of tube 894 through condenser 928. The control grid of tube 894 is connected to a −150 volt source through the serially connected resistances 934 and 935, the junction point of resistances 934, 935 being returned to ground through resistance 938. The cathode of tube 934 is connected to ground through the winding 940 of the waveoff relay 941.

In the circuitry thus far described, error voltages of negative polarity are cathode coupled to tube 891 through cathode follower 890. Errors of either positive or negative polarity cause the voltage at the anode of tube 891 to decrease from a maximum obtained when the voltage on lead 906 is zero. It is noted that the anode of tube 891 is coupled through a divider network to a regenerative pickoff stage, 892, 893, which serves to supply an energetic positive pulse to the control grid of the relay control cathode follower tube 894 whenever the applied grid voltage on the grid of tube 892 declines to the critical value of approximately 1.7 volts.

Negative derivative feedback is provided in the error rectifying amplifier 890, 891 giving a time delay which is an inverse function of the error magnitude. For this purpose, the condenser 923 has a value of one-tenth of a microfarad, resistance 911 is 2.2 megohms, resistance 920 is 470,000 ohms, resistance 921 is 500,000 ohms, resistance 922 is 2.2 megohms, resistance 910 is 10,000 ohms, and resistance 917 is 470,000 ohms. With these constants, a delay of approximately ten seconds is obtained when the applied error voltage is 50% beyond the threshold value of +6 volts.

The potentiometer resistance 921, the so-called "azimuth waveoff limit" resistance, provides the azimuth threshold value by determining to what value the anode of tube 891 must fall, to operate the regenerative pickoff circuit at 892, 893.

The potentiometer resistance 910, the "azimuth waveoff symmetry" resistance, allows a balanced adjustment of errors to the left and right of the course line. The tap on this resistance 910 may be adjusted, where conditions warrant, to achieve a "waveoff" condition with a smaller error to one side of the course line than to the other. Thus, when an excessive error endures for a predetermined time, the relay winding 940 is energized to actuate the relay switches 950, 951.

The actuation of switch 950 results in the application of +28 volts to a stationary contact of the relay switch 953 associated with the relay winding 885.

Actuation of switch 951 results in short-circuiting the terminals 955, 956 of the waveoff bus 130. The same result may be achieved manually by operation of the manual control waveoff switch S–3004 which is connected between the terminals 955, 956.

*Course softening circuitry in Figure 18B*

The output voltage of the azimuth angle tracking circuitry appearing on the cathode of cathode follower stage V4B is directly proportional to the deviation from an "on course" position and is applied either to the rate generator 726 (Figure 16) in "ground rate" operation or to the course softening circuitry 715 (Figure 17) in "air rate" operation. The output voltage of the elevation angle tracking circuitry, directly proportional to the deviation from an "on glidepath" position, is applied directly from the cathode of cathode follower stage 614 (V20B) to course softening circuitry 715 in both "air rate" and "ground rate" operations.

As explained previously, depending upon the particular autopilot equipment carried by an incoming aircraft, a rate of control function for azimuth displacement may be either transmitted from the ground equipment for reception with no further alteration by the autopilot approach coupler, or the ground equipment may transmit azimuth correction figures of pure error only, with rate of error complements being added by the autopilot approach coupler circuitry. The "ground-air rate" switch S–3010 determines the circuitry in this respect.

When the single-pole double-throw switch S–3010 is set to the "air rate" position, the circuitry of the rate generator 726 is disconnected and azimuth error signals are applied to the course softening circuitry 715, such signals in the latter instance representing pure error only.

In such case the output of the azimuth angle tracking circuitry is taken from the cathode of the cathode follower tube V4B through resistances 740 and 741. By this means azimuth error signals are applied to the control grid of the cathode follower stage 742 which has its cathode connected to a −150 volt source through the serially connected resistances 743, 744 and 745, the resistance 744 providing a zero displacement adjustment. The tap on resistance 744 is, in the "air rate" position of switch S–3010, returned to ground through the serially connected resistances 746, 747, the junction point of resistances 746, 747 being connected through coupling condenser 748 to the control grid of tube 749. The control grid for tube 749 constitutes an element of an input circuit for the course softening circuit 715. A gain control potentiometer 750 provides means for determining the amplitude of the voltage applied to the control grid of tube 749. It is noted that such control grid is returned to ground through the serially connected resistances 751, 752, the junction point of such resistances being connected to a −150 volt source through resistance 753.

When switch S–3010 is set in its "ground rate" position, the rate generator 726 is effective and provides azimuth rate of control voltages. The rate generator stage 726 includes the inverter-differentiator tubes 755, 756, cathode follower 757, and tubes 758, 759. The control grid of tube 755 is connected to the cathode of tube V4B through series resistances 740, 760 and 761. The cathode of tube 755 is returned to ground through resistance 763. The anode of tube 755 is connected to a +300 volt source through the load resistance 765 and such anode is connected to the control grid of the cathode follower tube 756. The cathode of tube 756 is connected to a −150 volt source through the serially connected resistances 766, 767, the junction point of resistances 766, 767 being connected through resistance 768 to the junction point of resistances 760, 761. A differentiating circuit comprising the serially connected condenser 770 and resistance 771 is connected between the control grid of tube 755 and its cathode. The junction point of elements 770, 771 is connected to the cathode of tube 756. By this means a voltage is developed on the cathode of tube 756 which corresponds to the rate of variation of voltage developed on the cathode of tube V4B; i.e., a rate of error signal is developed at the cathode of tube 756.

The cathode of tube 756 is coupled through condenser 772 to the control grid of cathode follower stage 757, the cathode of which is connected to a −150 volt source through the serially connected resistances 775, 776. The resistance 775 provides a zero adjustment and for that purpose has its tap connected through resistance 777 to the control grid of tube 758. Tube 758 is essentially an amplifier tube and has its cathode returned to ground through resistance 778 and its anode connected through load resistance 779 to a positive 300 volt source. The anode of tube 758 is connected to the control grid of cathode follower tube 759 which has its cathode connected to a −150 volt source through serially connected resistances 780, 781. Resistance 782 interconnects the cathodes of tubes 758 and 759. The junction point of resistances 780, 781 is connected through the switch S–3010 and resistance 747 to the control grid of the course softening tube 749.

The composite information, applied to the course softening tube 749, consists of the addition of azimuth rate of error voltages applied through cathode follower tube 742 and azimuth rate of error voltages applied from the rate generator circuit which includes the cathode follower tube 759.

The course softening circuits which are presently described include as elements thereof the tube 749 for azimuth purposes and the tube 784 for elevation purposes. It is noted that the circuitry following such tubes 749 and 784 are substantially identical and for that reason a description of the azimuth course softening circuit, including the tube 749, suffices as a description for the elevation course softening circuit, including the tube 784. Briefly, in accomplishing course softening, the screen grid voltages of tubes 749 and 784 are varied automatically as a function of range voltage and, more specifically, as a function of modified range voltage; i.e., reference voltage. For that purpose, modified range voltage is applied to the junction point of screen resistances 785 and 786 associated respectively with the tubes 749 and 784. It is noted that such modified range voltage is developed on the cathode of cathode follower tube 788 which has its control grid connected to the adjustable tap on the "course softening gain control" resistance 789, one terminal of resistance 789 being grounded and the other terminal of resistance 789 being connected through resistance 790 to the movable contact of switch S–3010, whereby a different magnitude of range voltage appearing on lead 792 may be applied to the control grid of tube 788. The lead 792 extends from one terminal of the "course softening slope adjustment" resistance 793 to the cathode of tube 568 in the reference voltage generator. The other terminal of resistance 793 is connected to a stationary contact of switch S-3010 and to the junction point of resistances 795 and 796. The other terminal of resistance 795 is grounded and the other terminal of resistance 796 is connected to a +150 volt source. The tap on resistance 793 is connected to another stationary contact of switch S-3010. Thus, the potential at the cathode of the cathode follower tube 788 is dependent upon: (1) the output of the first thyrite element 456 in the reference voltage generator and, therefore, upon the target range delay voltage; (2) the setting of the tap on the "course softening slope adjustment" resistance 793 in the "ground rate" operation; and (3) the setting of the tap on resistance 750.

The cathode of tube 788 is connected to a −150 volt source through resistance 797 and is connected on the one hand through resistance 785 to the screen grid of tube 749 and on the other hand through resistance 786 to the screen grid of tube 784. Since the other circuitry associated with tube 784 is identical with the range circuitry associated with tube 749, tube 749 and its remaining associated circuitry only is described in detail.

The cathode of pentode tube 749 is grounded and the anode of such tube is connected to a +150 volt source through the voltage dropping resistance 800. A condenser 801 having one of its terminals connected to the anode of tube 749 and the other one of its terminals connected to the movable contact of the single-pole double-throw relay switch 802 is periodically charged to produce a "chopped" voltage upon vibration of the "chopper" relay 804 which has one of its terminals returned to ground through the serially connected resistance 805 and condenser 806 and which has its other terminal connected to the "tracking on" terminal 66 so that such relay 804 is vibrated during tracking of the aircraft. One stationary terminal of switch 802 is grounded and the other terminal of switch 802 is connected through the filtering circuit 808 to a full wave rectifier 809. By this means the output of the "course softening" modulator 749 is therefore converted to an A.C. wave form, the amplitude of which is controlled by the amplitude of voltage applied to the screen grid of tube 749; i.e., in direct relationship to the range of the tracked aircraft. The effect of the circuitry, then, is to lessen computed error or control signals within ranges close to touchdown, thereby preventing over control of the aircraft near touchdown. Following this modulation, the control signals are returned to a continuous or direct current status by rectification and suitable filtering means which includes the filter network 808. The output of the full wave rectifier appears on lead 811, the stage 809 being, in normal operation, short-circuited by the clutter gating relay switch 1340 which has one of its contacts connected to lead 811 and the other one of its contacts connected to resistance 821. The filter network 808 comprises the series resistance 812 and shunt connected condensers 813 and 814. The stage 809 for clutter gating purposes, comprises tubes 815 and 816, the anode of tube 815 being connected to the negative terminal of voltage source 817 which has its positive terminal connected to the junction point of resistance 812 with condenser 814. The cathode of tube 817 is connected to the output lead 811. The other tube 816 has its anode connected to the output lead 811 and its cathode connected to the positive terminal of voltage source 818, the negative terminal of source 818 being connected to the aforementioned junction point of elements 812, 814. A condenser 820 is connected between the lead 811 and ground, and such lead 811 is connected to the control grid of the cathode follower tube 821 which has its cathode connected to a −150 volt source through series resistances 823 and 824. The resistance 823 provides a zero control and has its tap connected to a stationary contact of the single-pole double-throw relay switch 825. The movable contact of switch 825 is connected to the azimuth control voltage output terminal 50. The voltage on the terminal 50 may be observed on the cross pointer type indicator 827 after, of course, the application of a control "on" signal to the relay terminal 134; i.e., after "confirmation" by the aircraft. In similar manner the azimuth error voltages applied to the control grid of tube 784 are likewise modulated, then converted into an A.C. voltage, restored to a D.C. voltage, and applied to the elevation output control voltage terminal 48, the voltage on which is likewise measured on the indicator 827.

In order to limit the amount of azimuth control transferred from the ground to the aircraft, there is provided an azimuth control voltage limit means which includes the two diodes 828 and 829. The cathode of tube 828 is connected to adjustable tap on resistance 830 which has one of its terminals grounded and the other of its terminals connected through the resistance 831 to a +150 volt source. The anode of tube 828 is connected to the cathode of tube 829; and the anode of tube 829 is connected to an adjustable tap on resistance 832 which has one of its terminals grounded and the other one of its terminals connected through resistance 833 to a −150 volt source. The anode of tube 828 and cathode of tube 829 are both connected to limit the continuous voltage permissible on the control grid of tube 821 and thereby limit the control voltage appearing on the output terminal 50. The function of this limiting control is thus to provide that aircraft entering control at a large initial error will not be presented with an excessive error or turn signal. In other words, the rate component of control is allowed to compete with the displacement signal at any value of initial error, in order to prevent excessive overshots on entry to the course.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a system of the character described, means for range tracking an object to develop a characteristic representative of the range of said object, said tracking means including an antenna beam periodically scanning a predetermined area to develop echo video signals of said object in space, means for deriving a second characteristic representative of the instantaneous position of the antenna beam in space, computing means sensitive to said first and second characteristics for establishing a predetermined glidepath for said object, angle gate generating means for developing an angle gate upon achievement of a coincident condition between said first and second characteristic, and means gating said video signal with said angle gate prior to application to said range tracking means.

2. In a system of the character described, means producing and periodically scanning an antenna beam through space to develop echo video signals from objects in said space, range tracking means sensitive to said video signals for developing a characteristic representative of the range of an object being tracked, means developing a second characteristic representative of the particular angular position of the antenna beam in space, computing means sensitive to said first and second characteristics for computing a predetermined glidepath for said object being tracked, said antenna beam producing means including a series of energy pulses, angle gate producing means for developing an angle gate at the time it requires an energy pulse to travel from said antenna beam producing means to said object being tracked, and means angle gating said video by said angle gate prior to application of said video to said range tracking means.

3. In a system of the character described, means for producing and scanning an antenna beam through space to develop echo video signals from objects in said space, range tracking means sensitive to said video signals for developing a characteristic representative of the range of the object being tracked, means deriving a second characteristic representative of the instantaneous angular position of the antenna beam in space, means sensitive to said first characteristic and said second characteristic for computing a predetermined glidepath, means sensitive to said first characteristic and said second characteristic for developing an angle gate, means for angle gating said video with said angle gate prior to its application to said range tracking means, means for deriving a third characteristic representative of the deviation of the object from said predetermined glidepath, said last mentioned means including a servo loop which measures the deviation of said object from said glidepath at the time of said coincident condition between said first and second characteristics.

4. In a system of the character described, means for producing and scanning through space an antenna beam for deriving echo video signals, range tracking means sensitive to said video echo signals for deriving a characteristic representative of the range of the object being tracked, means deriving a second characteristic representative of the instantaneous angular position of the antenna beam in space, computing means sensitive to said first characteristic and said second characteristic for developing an alternating voltage, the cross-over points of which represent a predetermined glidepath, means deriving an angle gate at the occurrence of the center of a group of radar hits on said object, means angle gating said video with said angle gate prior to application of said video to said range tracking means, error tracking means for comparing the occurrence of said cross-over point with the occurrence of said video for deriving a characteristic representative of the error of the object from said predetermined glidepath.

5. In a system of the character described, means for producing and scanning an antenna beam through space to derive video echo signals from objects in said space, range tracking means sensitive to said video signals for deriving a characteristic representative of the range of the object being tracked, means deriving a second characteristic representative of the instantaneous angular position of the antenna beam, means deriving a "video on" gate which has a finite duration lasting for the duration of all antenna beam hits on the object, plus a small time interval thereafter, computing means sensitive to said first characteristic and said second characteristic for deriving an alternating voltage, predetermined points which correspond to a predetermined glidepath for said object, error tracking means for measuring and producing error voltages representing the deviation between the occurrence of the center said "video on" gate and the establishment of said predetermined points.

6. The arrangement set forth in claim 5 in which said last mentioned means includes a servo loop incorporating means for developing a step function at each of said predetermined points and means for comparing the step function with the "video on" gate.

7. The arrangement set forth in claim 5 in which angle gate producing means are incorporated for developing an angle gate at the occurrence of each of said predetermined points, and means angle gating said video with said angle gate prior to application of said video to said range tracking means.

8. In a system of the character described, means including an antenna beam scanning in alternate directions through a relatively small angular distance in space for developing video signals, a source of triggering voltages, a range tracking circuit coupled to said source for developing an electrical characteristic representative of the range of an object being tracked, means deriving from said video signals a stretched video signal, means sensitive to the center of said stretched video signal for deriving an angle gate only when said antenna beam is in a predetermined position with respect to the center of said stretched video signal, means for applying said video signals to said range tracking circuit to produce said electrical characteristic, and means gating said video with said angle gate before application of said video to said range tracking circuit.

9. In a system of the character described, means for producing an electrical characteristic representative of the range of an object being tracked, said means including an antenna beam scanning in alternate directions through a relatively small angular distance in space for developing video signals, means coupled to said producing means for producing a range gate, means gating said video signals about said range gate before application of said video signals to said producing means, means for deriving an angle gate only when said antenna beam is in a predetermined position, means for gating the range gated video by said angle gate prior to application of said video to said producing means whereby said producing means is sensitive to video which is both range gated and angle gated, video stretching means for producing a stretched video signal from the range and angle gated video signal, and said angle gate producing means being effective to produce said angle gate in accordance with the center of the stretched video signal.

References Cited in the file of this patent

UNITED STATES PATENTS

| | | |
|---|---|---|
| 2,519,935 | Smith et al. | Aug. 22, 1950 |
| 2,547,945 | Jenks | Apr. 10, 1951 |
| 2,566,331 | Huber et al. | Sept. 4, 1951 |
| 2,569,485 | McLennan | Oct. 2, 1951 |
| 2,571,386 | Sarnoff | Oct. 16, 1951 |
| 2,589,813 | Hulsizer | Mar. 18, 1952 |
| 2,709,804 | Chance et al. | May 31, 1955 |